(12) United States Patent
Bridgeman et al.

(10) Patent No.: US 8,721,782 B1
(45) Date of Patent: May 13, 2014

(54) CARBON BLACK PIGMENTED SOLID PHASE CHANGE INK FORMULATIONS

(71) Applicant: Xerox Corporation, Norwalk, CT (US)

(72) Inventors: Randall Ray Bridgeman, Tualatin, OR (US); Michael Meinhardt, Lake Oswego, OR (US); Scott Broce, Newberg, OR (US); Kelley Moore, Salem, OR (US); Anthony Yesnach, Wilsonville, OR (US); Jule W. Thomas, Jr., West Linn, OR (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 13/763,457

(22) Filed: Feb. 8, 2013

(51) Int. Cl.
*C09D 11/02* (2014.01)
(52) U.S. Cl.
USPC .................................. 106/31.61; 106/31.75

(58) Field of Classification Search
CPC ........................................................ C09D 11/34
USPC ...................... 106/31.6, 31.61, 31.86, 31.75
See application file for complete search history.

(56) References Cited

U.S. PATENT DOCUMENTS

| | | | | |
|---|---|---|---|---|
| 5,980,621 | A | * 11/1999 | Inaishi et al. | 106/31.29 |
| 6,224,661 | B1 | * 5/2001 | Tregub et al. | 106/31.61 |
| 6,858,070 | B1 | 2/2005 | Wong et al. | |
| 7,655,084 | B2 | 2/2010 | Wong et al. | |
| 7,973,186 | B1 | 7/2011 | Goredema et al. | |
| 2003/0127021 | A1 | * 7/2003 | Brown | 106/31.61 |
| 2008/0098927 | A1 | * 5/2008 | Allen et al. | 106/31.6 |
| 2010/0190904 | A1 | * 7/2010 | Wong et al. | 524/275 |

* cited by examiner

*Primary Examiner* — Veronica F Faison
(74) *Attorney, Agent, or Firm* — Shimokaji & Associates, P.C.

(57) ABSTRACT

A phase change ink formulation comprising an ink base, carbon black pigment and a poly(hydroxystearic acid) derived dispersant.

17 Claims, 1 Drawing Sheet

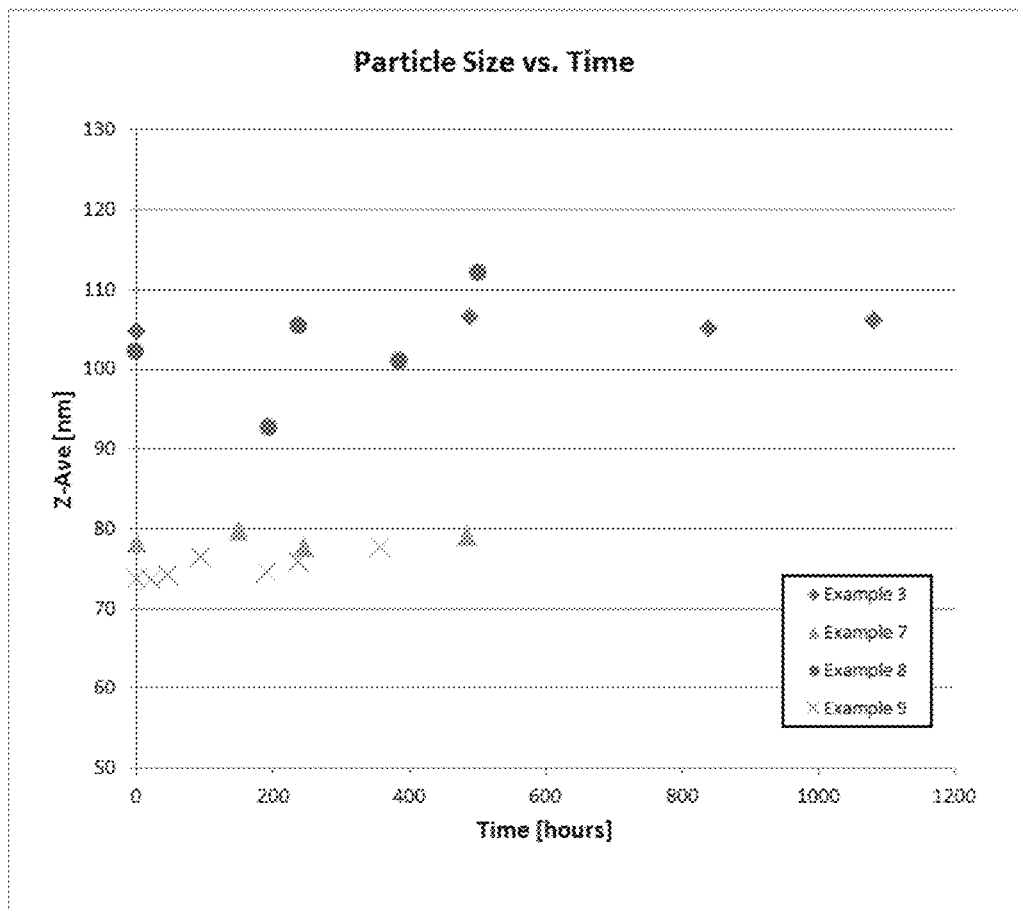

CARBON BLACK PIGMENTED SOLID PHASE CHANGE INK FORMULATIONS

TECHNICAL FIELD

This disclosure is generally directed to phase change ink formulations and methods for producing such ink formulations for use in forming images of good quality.

BACKGROUND

Disclosed herein are phase change ink formulations. More specifically, in one embodiment, disclosed herein are phase change ink formulations containing an ink base, a dispersant and a pigment colorant. In another embodiment, disclosed herein are phase change ink formulations containing an ink base, a dispersant, a pigment colorant, and a synergist.

In general, phase change inks (sometimes referred to as "hot melt inks") can be in the solid phase at ambient temperature, but exist in the liquid phase at the elevated operating temperature of an ink jet printing device. At the jet operating temperature, droplets of liquid ink can be ejected from the printing device and, when the ink droplets contact the surface of the recording substrate, either directly or via an intermediate heated transfer belt or drum, they quickly solidify to form a predetermined pattern of solidified ink drops. Phase change inks have also been used in other printing technologies, such as gravure printing, as dcan disclosed in, for example, U.S. Pat. No. 5,496,879 and German Patent Publications DE 4205636AL and DE 4205713AL, the disclosures of each of which are totally incorporated herein by reference.

Phase change inks for color printing typically comprise a phase change ink carrier composition which can be combined with a phase change ink compatible colorant. In a specific embodiment, a series of colored phase change inks can be formed by combining ink carrier compositions with compatible subtractive primary colorants. The subtractive primary colored phase change inks can comprise four component dyes, namely, cyan, magenta, yellow and black, although the inks are not limited to these four colors. These subtractive primary colored inks can be formed by using a single dye or a mixture of dyes. For example, magenta can be obtained by using a mixture of Solvent Red Dyes or a composite black can be obtained by mixing several dyes. U.S. Pat. No. 4,889,560, U.S. Pat. No. 4,889,761 and U.S. Pat. No. 5,372,852, the disclosures of each of which are totally incorporated herein by reference, teach that the subtractive primary colorants employed can comprise dyes from the classes of Color Index (C.I.) Solvent Dyes, Disperse Dyes, modified Acid and Direct Dyes, and Basic Dyes. The colorants can also include pigments, as disclosed in, for example, U.S. Pat. No. 5,221,335, the disclosure of which is totally incorporated herein by reference. U.S. Pat. No. 5,621,022, the disclosure of which is totally incorporated herein by reference, discloses the use of a specific class of polymeric dyes in phase change ink formulations.

Phase change inks can have also been used for applications such as postal marking, industrial marking, and labeling. Phase change inks can be desirable for ink jet printers because they remain in a solid phase at room temperature during shipping, long term storage, and the like. In addition, the problems associated with nozzle clogging as a result of ink evaporation with liquid ink jet inks can be largely eliminated, thereby improving the reliability of the ink jet printing. Further, in phase change ink jet printers wherein the ink droplets can be applied directly onto the final recording substrate (for example, paper, transparency material, and the like), the droplets solidify immediately upon contact with the substrate, so that migration of ink along the printing medium can be prevented and dot quality can be improved.

Compositions suitable for use as phase change ink carrier compositions are known. Some representative examples of references disclosing such materials include U.S. Pat. No. 6,309,453, U.S. Pat. No. 6,858,070, U.S. Pat. No. 7,311,768, U.S. Pat. No. 7,442,242, U.S. Pat. No. 7,655,084, and U.S. Pat. No. 7,973,186, the disclosures of each of which are totally incorporated herein by reference.

While known compositions and processes can be suitable for their intended purposes, a need remains for improved phase change inks. In addition, a need remains for phase change inks having carbon black pigment wherein the pigment particles can be stable and uniformly dispersed within the ink formulation, and can have increased stability and light fastness at elevated temperatures, thereby enabling improved fade resistance upon exposure to heat and/or light. In addition, there is a need for phase change inks containing carbon black pigments that exhibit reduced diffusion of the colorant from the ink to paper, thereby enabling reduced show through and improved image quality. Additionally, there is a need for phase change inks containing carbon black pigments wherein the pigments exhibit reduced agglomeration and settling in the ink when the ink is exposed to prolonged and/or excessive heating conditions. A need also remains for phase change inks containing carbon black pigments that exhibit reduced clogging of jets in the print head and reduced print head failure that might be caused by agglomeration of the pigment colorant in the ink.

SUMMARY

Disclosed herein are phase change ink formulations and methods of producing such ink formulations.

In one embodiment, an ink formulation is provided comprising an ink base, a poly(hydroxystearic acid) derived dispersant and a carbon black pigment.

In another embodiment, an ink formulation is provided comprising an ink base, a poly(hydroxystearic acid) derived dispersant, a synergist and a carbon black pigment.

A method is also provided for producing an ink formulation. The method comprises forming an ink base, forming a pigment concentrate by combining a poly(hydrostearic acid) dispersant and a carbon black pigment, and combining the ink base and the pigment concentrate.

BRIEF DESCRIPTION OF THE FIGURES

Various embodiments of the present disclosure can be described herein below with reference to the following figure wherein:

FIG. 1 is an illustration of the pigment particle size growth rate according to exemplary embodiments.

DETAILED DESCRIPTION

In this specification and the claims that follow, singular forms such as "a," "an," and "the" include plural forms unless the content clearly dictates otherwise. All ranges disclosed herein include, unless specifically indicated, all endpoints and intermediate values. In addition, reference may be made to a number of terms that shall be defined as follows:

The term "functional group" refers, for example, to a group of atoms arranged in a way that determines the chemical properties of the group and the molecule to which it can be attached. Examples of functional groups include halogen atoms, hydroxyl groups, carboxylic acid groups, and the like.

The term "optional" or "optionally" refer, for example, to instances in which a subsequently described circumstance may or may not occur, and include instances in which the circumstance occurs and instances in which the circumstance may not occur.

The terms "one or more" and "at least one" refer, for example, to instances in which one of the subsequently described circumstances occurs, and to instances in which more than one of the subsequently described circumstances occurs.

Phase change Ink formulations are provided herein that may comprise an ink base to which a dispersant and a pigment particle can be added. In certain embodiments, a synergist can also be added to the ink base. By the methods of this disclosure, the ink base can first be formed, followed by mixing with dispersant and the pigment particle and optionally with the synergist.

Ink Base

Examples of suitable ink base materials may include carrier wax, such as for example a Fischer-Tropsch wax. Fischer-Tropsch waxes can be prepared from the hydrogen and carbon monoxide mixture obtained by passing steam over hot coal. The synthesis can be carried out with metallic catalysts at high temperature and pressure. They can be synthetic hydrocarbons, as opposed to natural hydrocarbons. They differ from polyethylene waxes, which can be prepared by the polymerization of ethylene in that polyethylene waxes tend to be completely linear, whereas Fischer-Tropsch waxes tend to have some degree of branching therein. Because of this branching, Fischer-Tropsch waxes tend to be somewhat less crystalline and somewhat less hard compared to the perfectly linear polyethylene waxes.

Fischer-Tropsch waxes included in the ink formulations disclosed herein can have an average peak molecular weight, as measured in units of Daltons (Da) by high temperature gel permeation chromatography of, in one embodiment at least about 300, in another embodiment at least about 375, and in yet another embodiment at least about 400, in a further embodiment no more than about 800, in yet a further embodiment no more than about 750, and in yet a still further embodiment no more than about 700, although the average peak molecular weight can be outside of these ranges.

The Fischer-Tropsch wax can have a polydispersity (determined by dividing weight average molecular weight by number average molecular weight) in one embodiment of at least about 1.001, in another embodiment of at least about 1.005, and in yet another embodiment of at least about 1.010, and in a further embodiment of no more than about 3, in a further embodiment of no more than about 2.5, and in yet a still further embodiment of no more than about 2, although the pblydispersity can be outside of these ranges.

The Fischer-Tropsch wax can have a peak melting point (as measured by differential scanning calorimetry (DSC)) in one embodiment of at least about 50° C., in another embodiment at least about 55° C., and in yet another embodiment of at least about 60° C., and in one embodiment of no more than about 105° C., in another embodiment of no more than about 100° C., and in yet another embodiment of no more than about 95° C., although the peak melting point can be outside of these ranges.

The Fischer-Tropsch wax can have an onset melting point (as measured by differential scanning calorimetry (DSC)) in one embodiment of at least about 40° C., in another embodiment at least about 45° C., and in yet another embodiment of at least about 50° C., and in one embodiment of no more than about 105° C., in another embodiment of no more than about 100° C., and in yet another embodiment of no more than about 95° C., although the onset melting point can be outside of these ranges.

The Fischer-Tropsch wax can have a melting range, which is defined as the difference between ending melting point and onset melting point as defined in ASTM D3418-03, in one embodiment of at least about 5° C., in another embodiment at least about 8° C., and in yet another embodiment of at least about 10° C., and in one embodiment of no more than about 40° C., in another embodiment of no more than about 30° C., and in yet another embodiment of no more than about 25° C., although the melting range can be outside of these ranges.

The Fischer-Tropsch wax can have a freezing point (as measured by differential scanning calorimetry (DSC)) in one embodiment of at least about 40° C., in another embodiment at least about 50° C., and in yet another embodiment of at least about 55° C., and in one embodiment of no more than about 90° C., in another embodiment of no more than about 88° C., and in yet another embodiment of no more than about 85° C., although the freezing point can be outside of these ranges.

The Fischer-Tropsch wax can have a viscosity at about 110° C., in one embodiment of at least about 2 centipoise, in another embodiment of at least about 3 centipoise, and in yet another embodiment of at least about 4 centipoise, and in one embodiment of no more than about 11 centipoise, in another embodiment of no more than about 10 centipoise, and in yet another embodiment of no more than about 9 centipoise, although the viscosity can be outside of these ranges.

In one specific embodiment, the phase change inks disclosed herein may also contain a polyethylene wax. This polyethylene wax can have an average peak molecular weight, as measured in units of Daltons (Da) by high temperature gel permeation chromatography, of in one embodiment at least about 350, in another embodiment at least about 400, and in yet another embodiment at least about 470, and in one embodiment no more than about 730, in another embodiment no more than about 700, and in yet another embodiment no more than about 600, although the average peak molecular weight can be outside of these ranges.

The polyethylene wax can have a polydispersity (determined by dividing weight average molecular weight by number average molecular weight) in one embodiment of at least about 1.0001, and in one embodiment of no more than about 1.5, in another embodiment of no more than about 1.4, in yet another embodiment of no more than about 1.3, in still another embodiment of no more than about 1.2, in another embodiment of no more than about 1.1, and in yet another embodiment of no more than about 1.05, although the polydispersity can be outside of these ranges.

The polyethylene wax can have a peak melting point (as measured by differential scanning calorimetry (DSC)) in one embodiment of at least about 50° C., in another embodiment at least about 60° C., and in yet another embodiment of at least about 70° C., and in one embodiment of no more than about 130° C., in another embodiment of no more than about 125° C., and in yet another embodiment of no more than about 120° C., although the peak melting point can be outside of these ranges.

The polyethylene wax can have an onset melting point (as measured by differential scanning calorimetry (DSC)) in one embodiment of at least about 50° C. in another embodiment at least about 52° C., and in yet another embodiment of at least about 55° C., and in one embodiment of no more than about 71° C., in another embodiment of no more than about 70° C., and in yet another embodiment of no more than about 69° C., although the onset melting point can be outside of these ranges.

The polyethylene wax can have a melting range, which can be defined as the difference between ending melting point and onset melting point as defined in ASTM D3418-03, in one embodiment of at least about 5° C., in another embodiment at least about 8° C., and in yet another embodiment of at least about 10° C., and in one embodiment of no more than about 40° C., in another embodiment of no more than about 35° C., and in yet another embodiment of no more than about 30° C., although the melting range can be outside of these ranges.

The polyethylene wax can have a freezing point (as measured by differential scanning calorimetry (DSC)) in one embodiment of at least about 40° C., in another embodiment at least about 50° C., and in yet another embodiment of at least about 55° C., and in one embodiment of no more than about 80° C., in another embodiment of no more than about 75° C., and in yet another embodiment of no more than about 70° C., although the freezing point can be outside of these ranges.

The polyethylene wax can have a viscosity at about 110° C., in one embodiment of at least about 3 centipoise, in another embodiment of at least about 4 centipoise, and in yet another embodiment of at least about 4.5 centipoise, and in one embodiment of no more than about 10 centipoise, in another embodiment of no more than about 9 centipoise, and in yet another embodiment of no more than about 8 centipoise, although the viscosity can be outside of these ranges.

The ink base can also contain resins and other waxes such as Crodamide 203 (commercially available from Croda), Crodamide ORX (commercially available from Croda), Kemamide S-180 and E-180 (commercially available from PMC Biogenix, Inc.), Unislip 1750 (commercially available from Croda), Uniclear 80 (commercially available from Arizona), a dicapryladipate compatibilizer such as Arizona SP-100, Vybar 263 and 243 (commercially available from Baker Hughes), 1-docosanol (commercially available from Aldrich), Unilin 700 (commercially available from Baker Hughes), Beeswax Cerra Bellina (commercially available from Kester), branched BK-42 ester (commercially available from Kester), Kester Wax $K_{82}$-D, hydroxypolyester K-82-P, synthetic Karnauba K-82-H, Siliconyl Beeswax (commercially available from Kester), stearyl alcohol 98 NF (commercially available from Kester), Kraton D1101 (commercially available from Kraton Polymers), Behenyl Behenate, straight chain even numbered mono esters having a carbon chain from C-40 to C44 (commercially available from Kester as Kester Wax 72), synthetic paraffin wax of a sharp melting point such as Callista 158 (commercially available from Shell), microcrystalline branched hydrocarbon waxes such as Microwax HG (commercially available from Paramelt), melting point in the range of 80 to 86° C., and Microwax P827, Kemamide S-221, polyethyleneglycol 400 distearate (commercially available from Mosselman); paraffin waxes such as HNP-9 and HNP-12 (commercially available from Nippon Seiro Co.); semi-crystalline wax such as HIMIC-2065 (commercially available from Nippon Seiro Co.); hydrogenated styrene-butadiene copolymers of low molecular weight such as Tuftec H1141.11102 (commercially available from Asahi Kasei Corp); ethylene-propylene copolymers such as EP-700 and EP-602 (commercially available from Baker Hughes); Unithox 420 ethoxylate (commercially available from Baker Hughes); propylene-ethylene copolymer alcohols of melting point in the range of 65 to 100° C. (commercially available from Baker Hughes); maleic anhydride mono-isopropyl maleate such as Ceramer 1251 (commercially available from Baker Hughes); alpha olefin-maleic anhydride polymer of melting point of about 80° C., oxidized ethene homopolymer, Petrolite C-9500 (commercially available from Baker Hughes); oxidized 1-propene with ethane, Cardis 314, (commercially available from Baker Hughes), Victory Amber wax (commercially available from Bareco), oxidized PE such as OX-020T (commercially available from Nippon Seiro Co.).

The ink can also contain paraffin waxes and microcrystalline waxes.

Paraffin wax is a straight chain hydrocarbon having a melting point of about 49 to 71° C.; microcrystalline wax can be separated from asphalts and can be higher in MW and more branched than the paraffin wax. The melting point of microcrystalline waxes can be between 60 and 89° C. Examples of suitable paraffin waxes can be HNP-3, 5, 9, 10, 11 and HNP-12 (commercially available from Nippon Seiro Co.).

The ink base also can comprise a triamide resin. Examples of suitable triamide resins can be found in U.S. Pat. No. 6,860,930. Of particular use is a triamide resin which is the adduct of UNICID® 550 (a mono-acid obtained from Baker-Hughes Corp, Houston, Tex.) and JEFFAMINE® T-403 (a mixture of triamines obtained from Huntsman Corporation, Houston, Tex.) as described in Example II of U.S. Pat. No. 6,860,930. In addition many other suitable resins are described within the body of that patent which are included by reference in its entirety.

The ink base also can comprise a urethane resin. Examples of suitable ink base materials can be isocyanate-derived resins and waxes, such as urethane isocyanate-derived materials, urea isocyanate-derived materials, urethane/urea isocyanate-derived materials, mixtures thereof, and the like. Further information on isocyanate-derived carrier materials is disclosed in, for example, U.S. Pat. Nos. 5,750,604, 5,780,528, 5,782,966, 5,783,658, 5,827,918, 5,830,942, 5,919,839, 6,255,432, 6,309,453, British Patent GB 2 294 939, British Patent GB 2 305 928, British Patent GB 2 305 670, British Patent GB 2 290 793, PCT Publication WO 94/14902, PCT Publication WO 97/12003, PCT Publication WO 97/13816, PCT Publication WO 96/14364, PCT Publication WO 97/33943, and PCT Publication WO 95/04760, the disclosures of each of which are totally incorporated herein by reference.

Various modifying agents can be added to a phase change ink composition. Desirable modifying agents include amorphous resins which can be compatible with carrier waxes such as Fischer-Tropsch waxes described above. A desirable modifying agent can be KE-100 resin, a glycerol ester of hydrogenated abietic (rosin) acid made by Arakawa Chemical industries, Ltd. Other suitable resins are described in U.S. Pat. No. 5,372,852.

Other suitable modifying agents can be urethane resins. The ink can contain a urethane resin obtained from the reaction of two equivalents of Abitol E hydroabietyl alcohol (Eastman Kodak Chemical Co) and one equivalent of isophorone diisocyante, prepared as described in Example 1 of U.S. Pat. No. 5,782,966, the disclosure of which is totally incorporated herein by reference. When present, these modifying agents or resins can be present in the ink in one embodiment in an amount of at least about 2% by weight of the ink carrier, in another embodiment at least about 3% by weight of the ink carrier, and in yet another embodiment at least about 5% by weight of the ink carrier, and in one embodiment no more than about 80% by weight of the ink carrier, in another embodiment no more than about 70% by weight of the ink carrier, and in yet another embodiment no more than about 60% by weight of the ink carrier, although the amount can be outside of these ranges.

Additional examples of suitable phase change ink carrier materials can be monoamides, tetra-amides, mixtures thereof, and the like. Specific examples of suitable fatty amide ink carrier materials include stearyl stearamide, such as KEMAMIDE® S-180, available from PMC Biogenix, Inc, Memphis, Tenn., and the like. Further information on fatty amide carrier materials is disclosed in, for example, U.S. Pat. Nos. 4,889,560, 4,889,761, 5,194,638, 4,830,671, 6,174,937, 5,372,852, 5,597,856, 6,174,937, and British Patent GB 2 238 792, the disclosures of each of which are totally incorporated herein by reference. In one specific embodiment, a monoamide can be present in the ink carrier in an amount in one embodiment of at least about 0.01% by weight of the carrier, in another embodiment of at least 2% by weight of the carrier, and in yet another embodiment of at least about 5% by weight of the carrier, and in one embodiment of no more than about 90% by weight of the carrier, in another embodiment of no more than about 80 percent by weight of the carrier, and in yet another embodiment of no more than about 70% by weight of the carrier, although the amount can be outside of these ranges.

The ink base can also optionally contain an antioxidant. The optional antioxidants of the ink formulations may protect the ink components from oxidation during the heating portion of the ink preparation and jetting processes. Specific examples of suitable antioxidants are set forth in U.S. Pat. No. 6,858,070, col. 17, lines 25-36, the disclosure of which is totally incorporated herein by reference. When present, the optional antioxidant can be present in the ink in any desired or effective amount, in one embodiment of at least about 0.01% by weight of the ink carrier, in another embodiment of at least about 0.1% by weight of the ink carrier, and in yet another embodiment of at least about 1% by weight of the ink carrier, and in one embodiment of equal to or less than about 20% by weight of the ink carrier, in another embodiment equal to or less than about 5% by weight of the ink carrier, and in yet another embodiment equal to or less than about 3% by weight of the ink carrier, although the amount can be outside of these ranges. When only one antioxidant can be used, a hindered amine is preferred, e.g.: NAUGARD 445 antioxidant (obtained from Chemtura Corp., Middlebury, Conn.).

The ink base can be present in the ink formulation prepared in one embodiment in an amount of at least about 50% by weight of the ink formulation, in another embodiment of at least about 60% by weight of the ink formulation, and in yet another embodiment of at least about 70% by weight of the ink formulation, and in one embodiment equal to or less than about 99% by weight of the ink formulation, in another embodiment equal to or less than about 98% by weight of the ink formulation, and in yet another embodiment equal to or less than about 95% by weight of the ink formulation, although the amount can be outside of these ranges.

The ink base can have a melting point of less than about 120° C., and in another embodiment of less than about 110° C., although the melting point of the ink carrier can be outside of these ranges.

Dispersant

A dispersant or mixtures of dispersants can be added to the ink base in any desired or effective amount for purposes of dispersing and stabilizing the pigment in the ink formulation.

The dispersant, in one embodiment is of at least about 30% by weight of the pigment particle, in another embodiment of at least about 80% by weight of the pigment particle, and in yet another embodiment not more than about 400% by weight of the pigment particle, although the amount can be outside of these ranges.

Examples of suitable dispersants can be polyalkylene succinimide dispersants such as those disclosed in U.S. Pat. No. 6,858,070, the disclosure of which is totally incorporated herein by reference. Dispersants can include the Chevron Oronite OLOA 11000, OLOA 11001, OLOA 11002, OLOA 11005, OLOA 371, OLOA 375, OLOA 411, OLOA 4500, OLOA 4600, OLOA 8800, OLOA 8900, OLOA 9000, OLOA 9200 and the like, commercially available from Chevron Oronite Company LLC, Houston, Tex., as well as mixtures thereof. Examples of suitable polyalkylene succinimides and their precursors and methods of making them are disclosed in, for example, U.S. Pat. Nos. 3,172,892, 3,202,678, 3,280,034, 3,442,808, 3,361,673, 3,172,892, 3,912,764, 5,286,799, 5,319,030, 3,219,666, 3,381,022, 4,234,435, and European Patent Publication 0 776 963, the disclosures of each of which are totally incorporated herein by reference.

Specific examples of suitable dispersants are the Solsperse® dispersants available from The Lubrizol Corporation, Wickliffe, Ohio and can include Solsperse® J500, Solsperse® 17000, Solsperse® 9000, Solsperse® 13240 as well as mixtures thereof. Examples of these dispersants are disclosed in U.S. Pat. No. 3,996,059, the disclosure of which is totally incorporated herein by reference.

A specific example of a suitable dispersant is poly(hydroxystearic acid) derived from 12-hydroxy stearic acid of formula I:

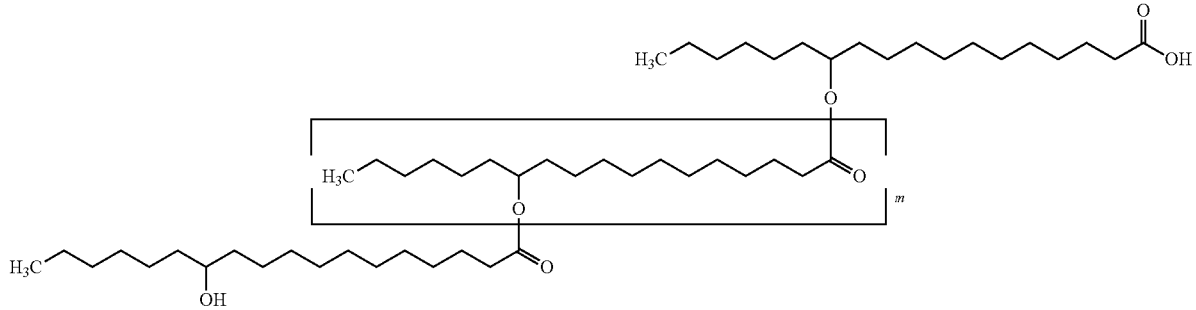

in which m is an integer between 1 and 5.

Specific examples of suitable dispersants can also be derived from poly(hydroxystearic acid) and a single equivalent of an amine containing a functional group, R of general formula II:

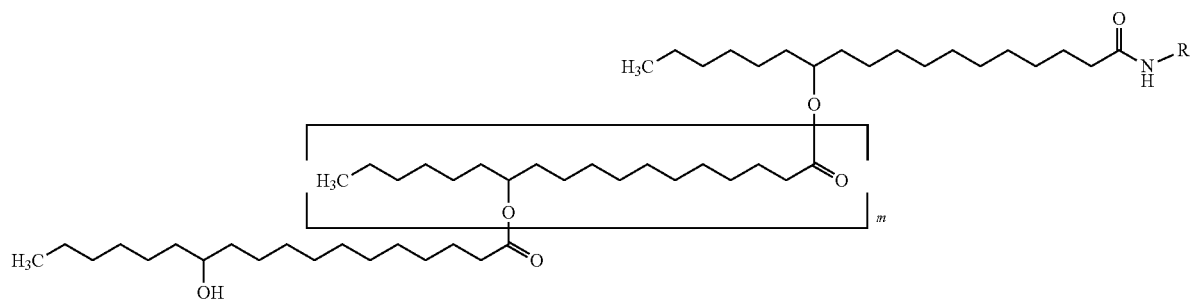
in which R is
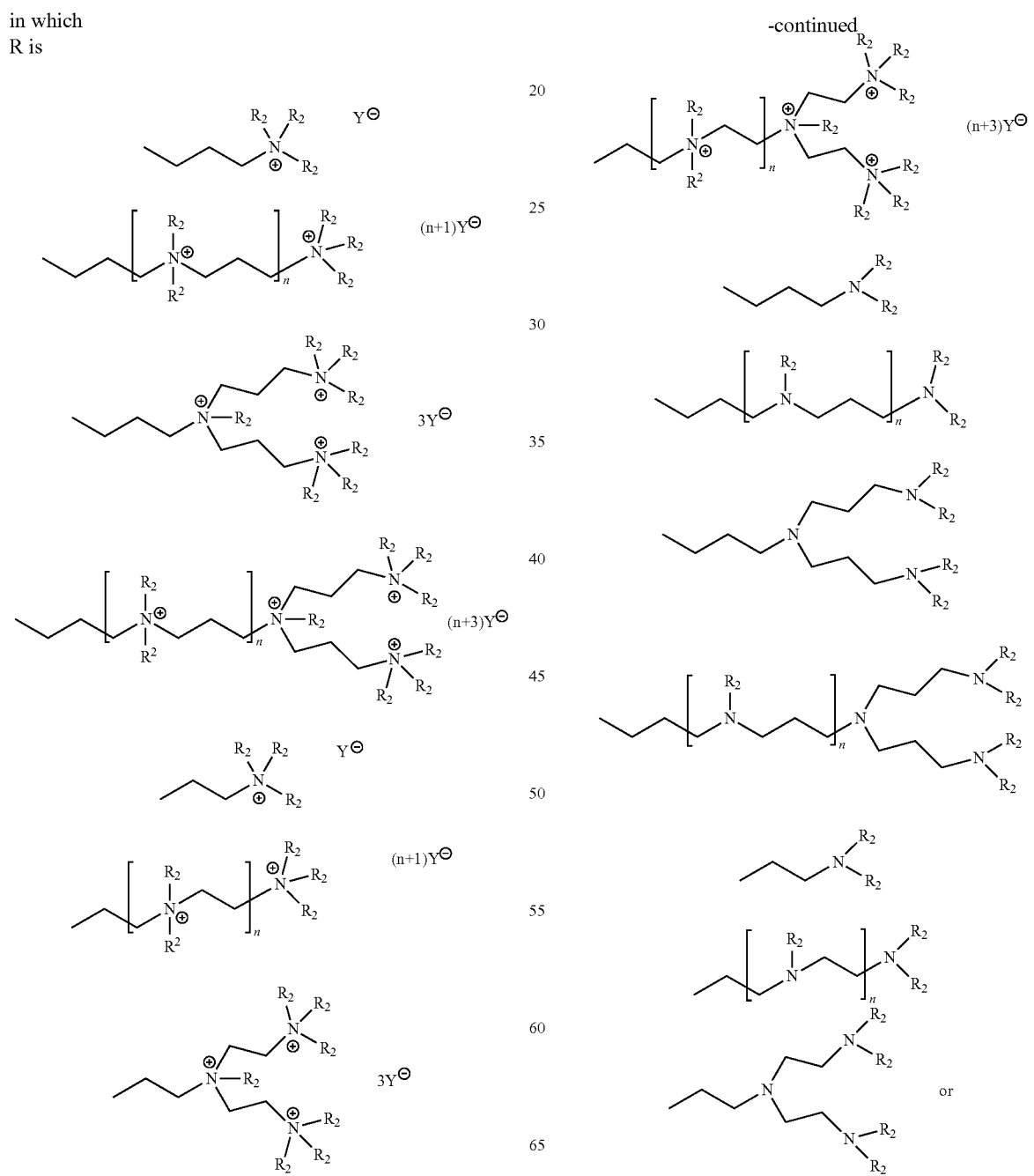
or

-continued

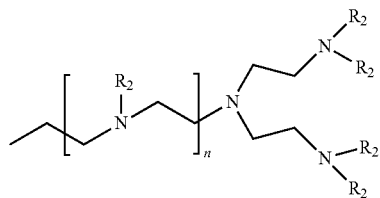

Y is $R_2SO_3$—, $CF_3SO_3$—, Cl—, Br—, I—, or $R_2CO_3^-$,
$R_2$ is independently H, —$CH_3$, —$C_2H_5$, —$C_3H_7$, —$C_4H_9$, —$C_5H_{11}$, —$C_6H_{13}$, —$C_7H_{15}$, —$C_8H_{17}$, —$C_9H_{19}$, —$C_{11}H_{21}$, —$C_{12}H_{23}$, —$C_{13}H_{25}$, —$C_{14}H_{27}$, —$C_{15}H_{29}$, —$C_{16}H_{31}$, —C17H33 or —$C_{18}H_{37}$ and m is an integer between 1 and 5 and n is an integer between 1 and 5.

Specific examples of dispersants can be those derived from the reaction of two equivalents of poly(hydroxystearic acid) and a di-functional group R of formula III:

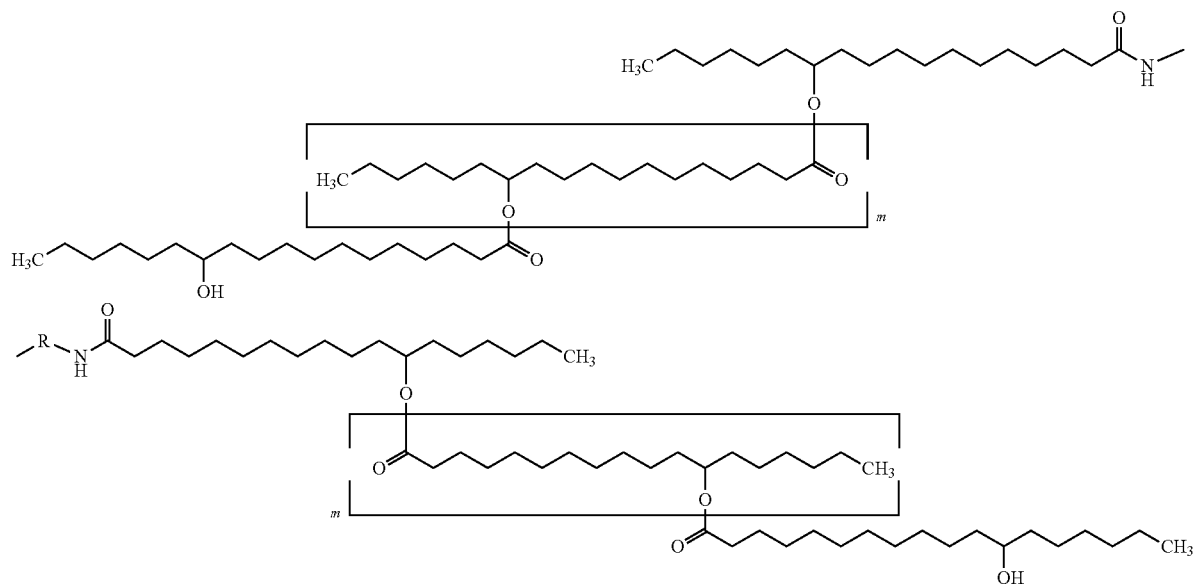

III in which
R is

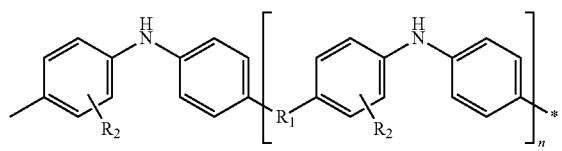 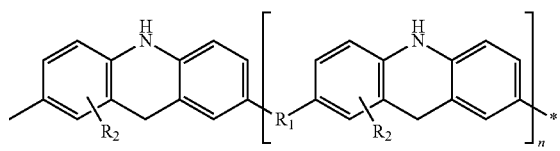

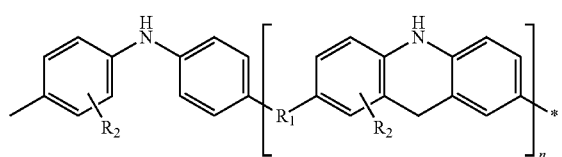 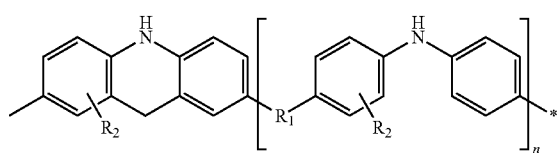

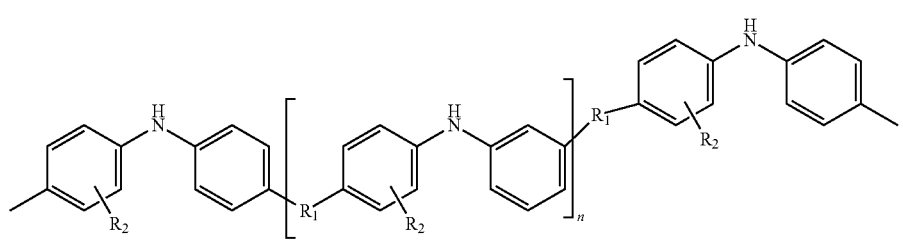

-continued
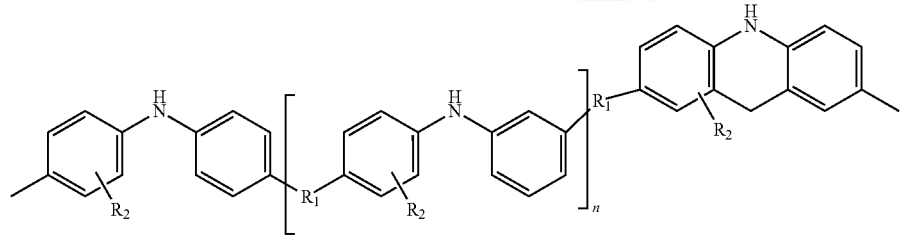
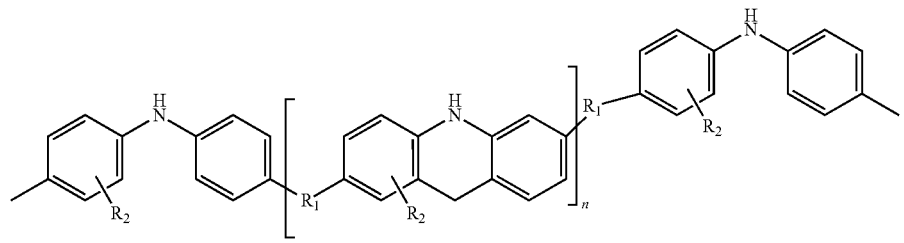
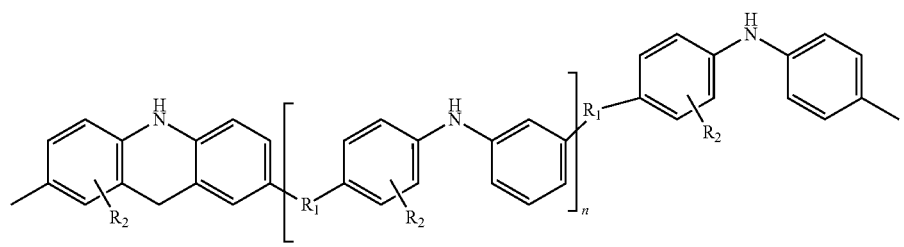
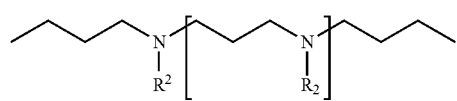
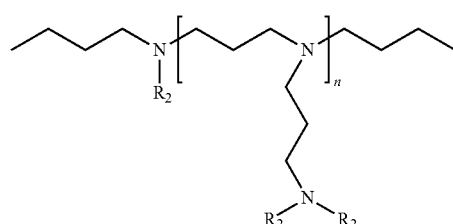
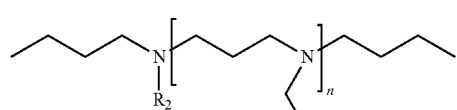
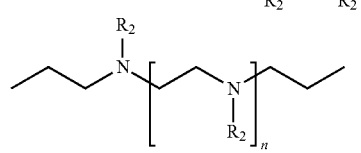
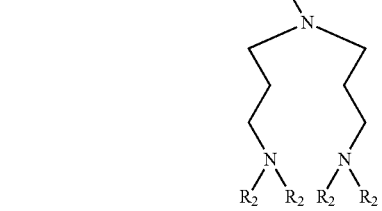
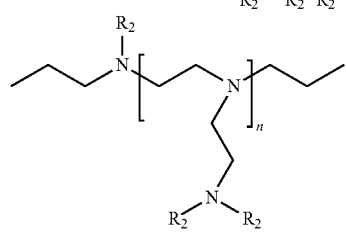
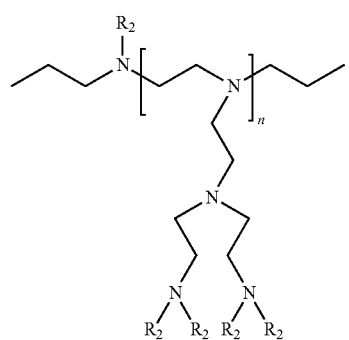

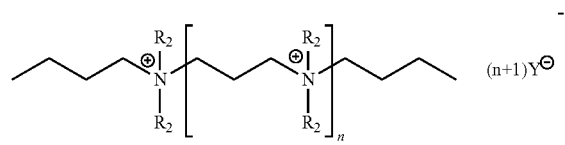

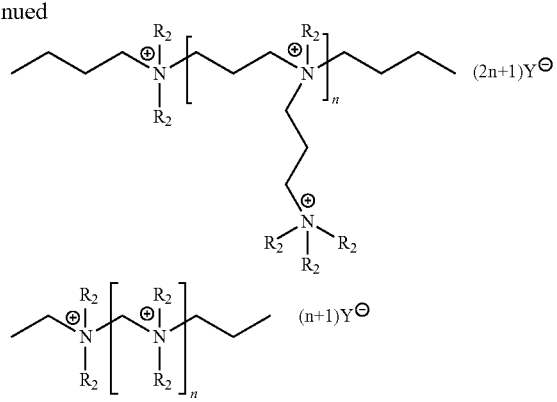

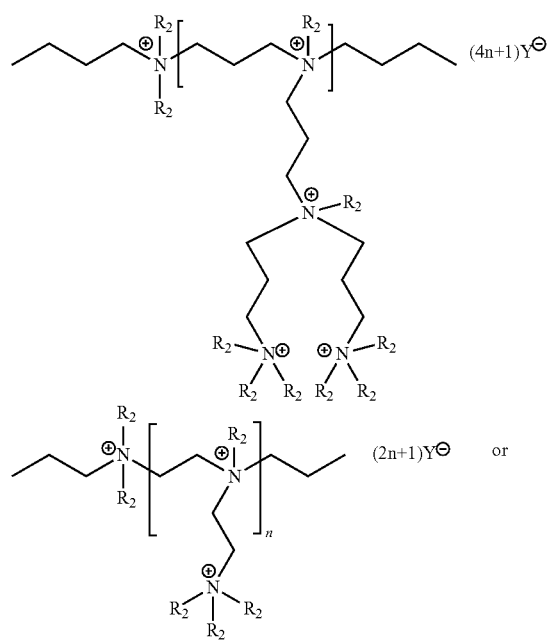

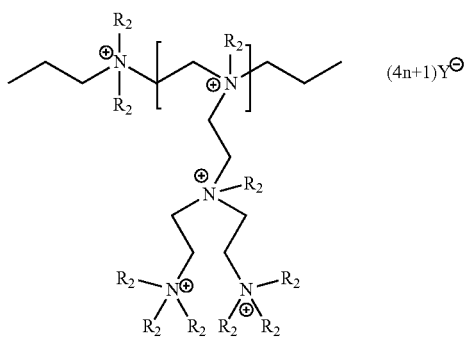

Y is $R_2SO_3$—, $CF_3SO_3$—, Cl—, Br—, I—, or $R_2CO_3$—,
$R_1$ is —$CH_2$, or —$CH(R_2)$;
$R_2$ is independently H, —$CH_3$, —$C_2H_5$, —$C_3H_7$, —$C_4H_9$, —$C_5H_{11}$, —$C_6H_{13}$, —$C_7H_{15}$, —$C_8H_{17}$, —$C_9H_{19}$, —$C_{11}H_{21}$, —$C_{12}H_{23}$, —$C_{13}H_{25}$, —$C_{14}H_{27}$, —$C_{15}H_{29}$, —$C_{16}H_{31}$, —$C_{17}H_{33}$ or —$C_{18}H_{37}$;
n is an integer between 1 and 5; and m is an integer between 1 and 5.

Synergists

A synergist or mixtures of synergists can be added to the ink base in any desired or effective amount for purposes stabilizing the pigment particle.

In general, pigment particles in a liquid based medium can tend to flocculate unless a suitable stabilization mechanism is employed. In non-aqueous systems, this can be achieved by adsorbing onto the pigment particle surface a molecule that can be entirely or partially soluble in the ink medium, which prevents, or at least hinders, pigment particles from approaching each other too closely such that they interact and flocculate. In order to achieve good thermal stability of the ink dispersion, the dispersant must be strongly associated to the pigment surface, such that it may not desorb from the pigment surface upon aging at elevated temperatures. Addition of a suitable synergist can assist in strengthening the pigment/dispersant interaction.

The synergist can contain functional groups capable of anchoring, or adsorbing, to the pigment particle surface. The functional groups may be polar groups. The synergist may be insoluble in a substantial portion of the ink vehicle, although it maybe soluble in a portion of the ink vehicle.

Examples of suitable functional groups that associate the synergist to the pigment particles include such functional groups as amines, amides, esters, sulfonates, carboxylic acids, hydroxyl groups, anhydrides, urethanes, ureas and salt groups such as quaternary ammonium salts, combinations thereof and the like. The groups anchor the synergist to the pigment particles such that the synergist can be, for example, adsorbed, attached to or grafted to the pigment particle. The groups can suitably anchor or adsorb to the pigment particle in any suitable manner, such as hydrogen bonding, covalent or ionic bonding, acid-base reaction, Van der Waals interactions, and the like.

Examples of synergists suitable for use herein include, but are not limited to, for example, SOLSPERSE® 5000 from Lubrizol (a copper phthalocyanine derivative), for example desirably used with blue, green or black pigments, SOLSPERSE® 12000 from Lubrizol, for example desirably used with blue, green or black pigments, SOLSPERSE® 22000 from Lubrizol for yellow, orange or red pigments, EFKA MI 6745 from BASF desirably used for blue or black pigments and EFKA MI 6750 from BASF desirably used for yellow, orange or red pigments.

In certain embodiments, the synergist is of at least about 10% by weight of the pigment particle, in another embodiment is of at least about 22% by weight of the pigment particle, and in yet another embodiment is of not more than about 30% by weight of the pigment particle, although the amount can be outside of these ranges.

Pigment Particle

A pigment particle can be added to the ink base and can be any desired or effective carbon black, provided that the pigment particle can be dispersed in the ink base, desirably a pigment particle containing oxygen-containing functional groups on the surfaces thereof, or functional groups such as oxygen-containing acidic groups can be placed on the surface of pigment particles by oxidation with materials such as nitric acid or ozone. Pigments having oxygen-containing functional groups on the surface thereof are known. Examples of commercially available pigments suitable for the ink formulations include (but are not limited to) SPECIAL BLACK 100, SPECIAL BLACK 250, SPECIAL BLACK 350, FW1, FW2 FW200, FW18, SPECIAL BLACK 4, NIPEX 150, NIPEX 160, NIPEX 180, SPECIAL BLACK 4, SPECIAL BLACK 5, SPECIAL BLACK 6, PRINTEX 80, PRINTEX 90, PRINTEX 140, PRINTEX 150T, PRINTEX 200, PRINTEX U, and PRINTEX V, all available from Evonik Industries AG, MOGUL L, REGAL 400R, REGAL 330, and MONARCH 900, available from Cabot Chemical Co., MA77, MA7, MA8, MA11, MA100, MA100R, MA100S, MA230, MA220, MA200RB, MA14, #2700B, #2650, #2600, #2450B, #2400B, #2350, #2300, #2200B, #1000, #970, #3030B, and #3230B, all available from Mitsubishi, RAVEN 2500 ULTRA, Carbon Black 5250, and Carbon Black 5750 available from Columbia Chemical Co., pigments such as those disclosed in U.S. Pat. No. 5,837,045 and U.S. Pat. No. 5,922,118, the disclosures of each of which are totally incorporated herein by reference, and the like, as well as mixtures thereof.

Examples of most suitable carbon blacks are Mogul L (commercially available from Cabot Corporation) and Nipex 150 (commercially available from Evonik Industries AG). In one specific embodiment, the pigment particles can have a primary volume average particle size in one embodiment of no less than about 0.01 micron as measured by electron microscopy according to ASTM 3849, and in one embodiment of no more than about 0.1 micron as measured by electron microscopy according to ASTM 3849, in another embodiment of no more than about 0.08 micron, although the primary particle size can be outside of these ranges. Primary average particle size means the size of the primary particles of carbon black present in the ink; these primary particles form aggregates of 2 or more particles when present in the ink. In one specific embodiment, the primary particles form aggregates that can have absorption values, as determined by ASTM method D2414, of at least about 45 cc/100 g of dibutyl phthalate oil, and in another embodiment of at least about 50 cc/100 g, and in one embodiment the primary particles form aggregates of no more than about 200 cc/100 g, and in another embodiment of no more than about 110 cc/100 g. In one specific embodiment, the pigment aggregates in the ink can have an average particle size of less than 300 nanometers by intensity as measured by dynamic light scattering (ASTM E2490-09), and in another embodiment of less than 200 nanometers, and in another embodiment of less than 100 nanometers. The carbon black having oxygen-containing functional groups on the surfaces thereof can be present in the phase change ink in any desired or effective amount to obtain the desired color or hue, in one embodiment at least about 0.1% by weight of the ink, in another embodiment at least about 0.2% by weight of the ink, and in yet another embodiment at least about 0.5% by weight of the ink, and in one embodiment not more than about 35% by weight of the ink, in another embodiment no more than about 5% by weight of the ink, and in yet another embodiment no more than about 2.5% by weight of the ink, although the amount can be outside of these ranges.

The ink phase change formulations in one embodiment can have peak melting points of no lower than about 50° C., in another embodiment of no lower than about 55° C., and in yet another embodiment of no lower than about 60° C., and can have melting points in one embodiment of no higher than about 105° C., in another embodiment of no higher than about 100° C., and in yet another embodiment of no higher than about 95° C., although the peak melting point can be outside of these ranges.

The ink phase change formulations generally can have melt viscosities at the jetting temperature (in one embodiment no lower than about 75° C., in another embodiment no lower than about 85° C., and in yet another embodiment no lower than about 95° C., and in one embodiment no higher than about 150° C., and in another embodiment no higher than about 120° C., although the jetting temperature can be outside of these ranges) in one embodiment of no more than about 30 centipoise, in another embodiment of no more than about 20 centipoise, and in yet another embodiment of no more than about 15 centipoise, and in one embodiment of no less than about 2 centipoise, in another embodiment of no less than about 5 centipoise, and in yet another embodiment of no less than about 7 centipoise, although the melt viscosity can be outside of these ranges. In another specific embodiment, the inks can have viscosities of from about 7 to about 15 centipoise at temperatures of about 110, 115, and/or 120° C.

The ink formulations can be prepared by any desired or suitable method. In one embodiment, the ink formulations can be prepared as follows:

Step 1. A carbon black pigment concentrate can be prepared by making a slurry of carbon black pigment in a molten mixture of a dispersant and stearyl stearamide (KEMAMIDE® S-180 available from PMC Biogenix, Inc., Memphis, Tenn.). This molten slurry can be added to a Union Process 1-S attritor (available from Union Process Corp., Akron, Ohio) equipped with a temperature controlled jacket, fitted with 8 inch arms and loaded with one eight inch spherical milling media. The bowl can be heated to 115° C. and the speed set to run at 250 RPM for 24 hours after which time the pigment slurry is discharged through a bottom valve to provide a pigment concentrate.

Alternate Step 1: A carbon black pigment concentrate can be prepared by making a slurry of carbon black pigment in a molten mixture of a dispersant, a synergist (Solsperse® 5000, available from Lubrizol Corp., Wycliffe, Ohio) and stearyl stearamide (KEMAMIDE® S-180 available from PMC Biogenix, Inc., Memphis, Tenn.). This molten slurry can be added to a Union Process 1-S attritor (available from Union Process Corp., Akron, Ohio) equipped with a temperature controlled jacket, fitted with 8 inch arms and loaded with one eight inch spherical milling media. The bowl can be heated to 115° C. and the speed set to run at 250 RPM for 24 hours after which time the pigment slurry can be discharged through a bottom valve to provide a pigment concentrate.

Step 2. An ink base can be prepared by melt mixing in a stainless steel beaker charged with appropriate proportions of a distilled polymethylene wax as described in Example 1 of U.S. Pat. No. 7,311,768, a triamide resin, prepared as described in Example II of U.S. Pat. No. 6,860,930, a glycerol ester of hydrogenated abietic (rosin) acid (KE-100e, available from Arakawa Chemical Industries, Ltd.), a urethane resin as described in Example 4 of U.S. Pat. No. 6,309,453, stearyl stearamide (KEMAMIDE® S-180 available from PMC Biogenix, Inc., Memphis, Tenn.) and an anti-oxidant (NAUGARD® N445, obtained from Uniroyal Chemical Company, Middlebury, Conn.) and stirring at about 115° C. for one hour.

Step 3. An ink can be prepared by adding an appropriate amount of a carbon black pigment concentrate of Step 1 to an ink base described in Step 2, above, and heating at about 115° C. The resulting mixture can be stirred for about 30 minutes before filtering through a heated Mott apparatus (available from Mott Metallurgical) at about 115° C. using Whatman #3 filter paper and at a pressure of about 15 pounds per square inch. The resultant ink can be poured into sticks and allowed to solidify.

Alternate Step 3. An ink containing a carbon black pigment and a synergist can be prepared by adding an appropriate amount of a carbon black pigment concentrate of Alternate Step 1 to an ink base described in Step 2, above, and heating at about 115° C. The resulting mixture can be stirred for about 30 minutes before filtering through a heated Mott apparatus (available from Mott Metallurgical) at about 115° C. using Whatman #3 filter paper and at a pressure of about 15 pounds per square inch. The resultant ink containing a carbon black pigment and synergist can be poured into sticks and allowed to solidify.

The ink formulations can be comprised of a carbon black pigment in one embodiment in the range of from about 0.1 to about 10% by weight of the ink, and a dispersant in the range of from about 0.03% to about 40% by weight of the ink with the remainder of the formulation being made up of the ink base. In another embodiment, the ink formulation can be comprised of a carbon black in the range of from about 0.2 to about 5% by weight of the ink, and a dispersant in the range of from about 0.06 to about 20% by weight of the ink with the remainder of the formulation being made up of the ink base. In yet another embodiment, the ink formulation can be comprised of a carbon black pigment in the range of from about 0.5 to about 3% by weight of the ink, and a dispersant in the range of from about 0.15 to about 12% by weight of the ink with the remainder of the formulation being made up of the ink base.

In another embodiment, the ink formulations can contain a synergist. The ink formulation can be comprised of a carbon black pigment in one embodiment in the range of from about 0.1 to about 10% by weight of the ink, a dispersant in the range of from about 0.03 to about 40% by weight of the ink, and a synergist in the range of from about 0.01 to about 3% by weight of the ink with the remainder of the formulation being made up of the ink base. In another embodiment, the ink formulation can be comprised of a carbon black in the range of from about 0.2 to about 5% by weight of the ink, a dispersant in the range of from about 0.06 to about 20% by weight of the ink, and a synergist in the range of from about 0.02 to about 1.5% by weight of the ink with the remainder of the formulation being made up of the ink base. In yet another embodiment, the ink formulation can be comprised of a carbon black in the range of from about 0.5 to about 3% by weight of the ink, a dispersant in the range of from about 0.15 to about 12% by weight of the ink, and a synergist in the range of from about 0.05 to about 0.9% by weight of the ink with the remainder of the formulation being made up of the ink base.

A synergist may be added to facilitate the process of making the pigment concentrate, and to enhance the interaction of pigment particle and dispersant, and thus, enhance the particle stability, The ink formulations can be employed in apparatus for direct printing ink jet processes and in indirect (offset) printing ink jet applications. Another embodiment disclosed herein is directed to a process which can comprise incorporating an ink as disclosed herein into an ink jet printing apparatus, melting the ink, and causing droplets of the melted ink to be ejected in an imagewise pattern onto a recording substrate. A direct printing process is also disclosed in, for example, U.S. Pat. No. 5,195,430, the disclosure of which is totally incorporated herein by reference. Yet another embodiment disclosed herein can be directed to a process which can comprise incorporating an ink as disclosed herein into an ink jet printing apparatus, melting the ink, causing droplets of the melted ink to be ejected in an image wise pattern onto an intermediate transfer member, and transferring the ink in the image wise pattern from the intermediate transfer member to a final recording substrate. In a specific embodiment, the intermediate transfer member can be heated to a temperature above that of the final recording sheet and below that of the melted ink in the printing apparatus. In another specific embodiment, both the intermediate transfer member and the final recording sheet can be heated; in this embodiment, both the intermediate transfer member and the final recording sheet can be heated to a temperature below that of the melted ink in the printing apparatus; in this embodiment, the relative temperatures of the intermediate transfer member and the final recording sheet can be (1) the intermediate transfer member can be heated to a temperature above that of the final recording substrate and below that of the melted ink in the printing apparatus; (2) the final recording substrate can be heated to a temperature above that of the intermediate transfer member and below that of the melted ink in the printing apparatus; or (3) the intermediate transfer member and the final recording sheet can be heated to approximately the same temperature. An offset or indirect printing process can be also disclosed in, for example, U.S. Pat. No. 5,389,958, the disclosure of which is totally incorporated herein by reference. In one specific embodiment, the printing apparatus employs a piezoelectric printing process wherein droplets of the ink can be caused to be ejected in image wise pattern by oscillations of piezoelectric vibrating elements. Inks as disclosed herein can also be employed in other hot melt printing processes, such as hot melt acoustic ink jet printing, hot melt thermal ink jet printing, hot melt continuous stream or deflection ink jet printing, and the like. Phase change inks as disclosed herein can also be used in printing processes other than hot melt ink jet printing processes.

Any suitable substrate or recording sheet can be employed, including plain papers such as XEROX® 4024 papers, XEROX® Image Series papers, Courtland® 4024 DP paper, ruled notebook paper, bond paper, silica coated papers such as Sharp Company silica coated paper, JuJo paper, HAMMERMILL LASERPRINT® paper, and the like, transparency materials, fabrics, textile products, plastics, polymeric films, inorganic substrates such as metals and wood, and the like.

Specific embodiments can now be described in detail. These examples are intended to be illustrative, and the invention is not limited to the materials, conditions, or process parameters set forth in these embodiments. All parts and percentages are by weight unless otherwise indicated.

EXAMPLES

Example 1

In a 1 liter stainless steel beaker heated at about 120° C. were melted 532 grams of a distilled polymethylene wax as described in Example 1 of U.S. Pat. No. 7,311,768, the disclosure of which is totally incorporated herein by reference (for example, SASOLWAX® C80, obtained from Sasol Wax Americas, Inc., Shelton, Conn.), 74.6 grams of stearyl stearamide (KEMAMIDE® S-180, obtained from PMC Biogenix, Inc., Memphis, Tenn.); 94.0 grams of a triamide resin prepared as described in Example II of U.S. Pat. No. 6,860,930, the disclosure of which is totally incorporated herein by reference; 93.6 grams of a glycerol ester of hydrogenated rosin acid (KE-100, obtained from Arakawa Chemical (USA), Inc., Chicago, Ill.), 4.50 grams of a urethane resin that was the adduct of three equivalents of stearyl isocyanate and a glycerol-based alcohol, prepared as described in Example 4 of U.S. Pat. No. 6,309,453, the disclosure of which is totally incorporated herein by reference and 1.28 grams of and antioxidant (NAUGARD® N445, obtained from Uniroyal Chemical Co., Middlebury, Conn.). The resulting mixture was blended by stirring in a temperature controlled mantle at about 120° C. for 0.5 hours. To this vehicle was added the ink concentrates of the Examples below. After stirring for about 2 additional hours, the ink thus formed was filtered through a heated MOTT® apparatus (obtained from Mott Metallurgical) using Whatman #3 filter paper under a pressure of about 15 pounds per square inch. The filtered phase change ink thus formed was poured into molds and allowed to solidify to form ink sticks.

Example 2

To a Union Process 1-S attritor (available from Union Process Corp, Akron, Ohio) equipped with a temperature controlled jacketed bowl, 8 inch arms and charged with ⅛ inch spherical milling media was charged a slurry composed of 400 gram of a carbon black pigment (Mogul L, commercially available from Cabot Corporation, Boston, Mass.), 88 gram of a synergist (Solsperse® 5000, commercially available from Lubrizol Corporation, Wycliffe, Ohio), 320 gram of a dispersant (Solsperse® J500, commercially available from Lubrizol Corporation, Wycliffe, Ohio) and 1.20 kg of stearyl stearamide (KEMAMIDE® S-180, obtained from PMC Biogenix, Inc. Memphis, Tenn.). The bowl was heated at 115° C. and the speed set to run at 250 RPM for 24 hours after which time the milled slurry was discharged through a bottom valve to provide a pigment concentrate.

Example 3

In a stainless steel beaker was placed 800 grams of a molten ink base prepared as described in Example 1 above. This mixture was heated in a mantle at about 115° C. and stirred with an overhead stirrer. To this was added 119.5 of a pigment concentrate prepared as described in Example 2, above. After stirring for about 0.5 hour at about 115° C., the ink thus formed was filtered through a heated MOTT® apparatus (obtained from Mott Metallurgical) using Whatman #3 filter paper under a pressure of about 15 pounds per square inch. The filtered phase change ink thus formed was poured into molds and allowed to solidify to form ink sticks.

Example 4

Following the method of making pigment concentrate described in Example 2, a pigment concentrate was prepared using 400 grams of Mogul L, 88 grams of Solsperse® 5000, 1.2 kg of stearyl stearamide and 320 grams of Solsperse® 17000 dispersant commercially available from Lubrizol Corporation, Wycliffe, Ohio.

Example 5

Following the method of making pigment concentrate described in Example 2, a pigment concentrate was prepared using 400 grams of Mogul L, 88 grams of Solsperse® 5000, 1.2 kg of stearyl stearamide and 320 grams of Solsperse® 9000 dispersant commercially available from Lubrizol Corporation, Wycliffe, Ohio.

Example 6

Following the method described in Example 2, a pigment concentrate was prepared using 400 grams of Mogul L, 88 grams of Solsperse® 5000, 1.2 kg of stearyl stearamide and 320 grams of Solsperse® 13240 dispersant commercially available from Lubrizol Corporation, Wycliffe, Ohio.

Example 7

Following the method described in Example 3, an ink was prepared using the pigment concentrate of Example 4 incorporating Solsperse® 17000 as the dispersant.

Example 8

Following the method described in Example 3, an ink was prepared using the pigment concentrate of Example 5 incorporating Solsperse® 9000 as the dispersant.

Example 9

Following the method described in Example 3, an ink was prepared using the pigment concentrate of Example 6 incorporating Solsperse® 13240 as the dispersant.

Various characteristics of the inks were measured. Viscosity was measured with a Rheometrics DSR-2000 cone-plate rheometer at 110° C. Glass transition temperature was measured by Dynamic Mechanic Analysis using a Rheometrics Solid Analyzer (RSA II). Peak melting point onset melting point and peak freezing point were measured by differential scanning calorimetry (DSC) using a DUPONT 2100 calorimeter. The melting points of these inks were about 80° C., the freezing points can be lower than 80° C., and the viscosities of most of them were close to about 10.6 at 110° C., indicating that they were suitable for jetting at temperatures of from about 105 to about 115° C.

One method for assessment of particle size growth stability can be performed by maintaining a molten sample of an ink at a constant temperature in the vicinity of the intended use temperature over several days or weeks and measuring the particle size distribution by dynamic light scattering at appropriate time intervals (ASTM E2490-09). One such instrument can be the Malvern Nanosizer® HT, obtained from Malvern Instruments Ltd, Worcestershire, United Kingdom. Typically it can be sufficient to assess stability by following a single parameter of the particle size distribution such as the D(i, 0.50) or Z-average particle size over time.

Particle size growth stability can be a measure of the constancy of any of several parameters of the particle size distribution over time at a specified temperature. Typical parameters such as Z-average, D(0.50) and D(0.95) can be measured and plotted over time after holding at constant use temperatures. FIG. 1 is an illustration of pigment particle size growth rate over time and demonstrates that the Z-average is unchanged over time for inks of Examples 3, 7, 8 and 9.

Printhead stability testing can be an assessment of particle size stability due to aggregation or agglomeration and/or gravitation settling in the intended usage environment and at the intended usage temperature. Inks prepared as in the examples above were placed in a Xerox Phaser 8860 color printer, commercially available from Xerox Corporation, Stamford, Conn. The ink was maintained molten and quiescent without printing in the vicinity of the usage temperature for a number of days. Typically, after about 10 days, a series of solid fill test prints were made and the uniformity of optical density was assessed.

Optical density uniformly can be a measure of printhead stability when jetted after a quiescent period at continuous operating temperature. Several potential failure modes lead to degradation of optical density uniformity including gravitational settling, degradation of dispersant or general destabilization of the particle size distribution. An ink showing good printhead stability can show uniform optical density whereas a poorly performing ink can exhibit substantially non-uniform optical density.

Thermal stability can be evaluated by holding the molten ink at elevated temperature for various lengths of time. Degradation by any of several mechanisms are evidence of thermal instability. For example, changes in viscosity over time measured on a Rheometrics DSR-2000 cone-plate rheometer can be indicative of thermal degradation of dispersant, particle size growth or particle agglomeration. Changes in electrical conductivity of a molten ink over time represent evidence of thermal instability of one or more components of the system. Thermal degradation of dispersant can result in off-gassing giving rise to objectionable odors. Qualitatively or quantitatively any of these measures alone or together can be used to assess the relative thermal stability of the inks of the present disclosure.

Thermal stability can be a measure of the tendency of the dispersant to undergo particle size degradation as a function of temperature in the vicinity of the intended use temperature. The particle size distribution of a thermally stable ink would be insensitive to temperature in the vicinity of the intended use temperature. A less thermally stable ink would exhibit greater relative growth of particle size distribution, viscosity or other attributes related to the function of the system.

Oxidative stability in oxygen permeable tubing can be a specific measurement of suitability for use in printing systems. Typically, oxygen permeable tubing can be filled with molten inks and suspended in an oven at 115° C. After a period of time, typically days, the ink is drained from the tube and inspected for evidence of pigment agglomeration or ink vehicle degradation.

Ink jet printing technology is intimately related to the ability of the printhead to eject drops in a controlled manner. Typically, the molten ink can be static in the printhead aperture until a pressure pulse is applied resulting in drop ejection. Surface tension of the fluid then can serve to re-establish the fluid in the aperture. However, this capability may be degraded when pigments or dispersants wet out the faceplate resulting in a range of degradation from slight wetting of the faceplate, to puddling or pooling of ink on the faceplate, and to a severe loss of the ability to re-establish a meniscus. Therefore qualitative assessment of the faceplate wetting tendency of inks can be a crucial performance dimension in selecting a useful ink formulation.

Table 1 describes qualitatively the relative performance of inks prepared as described in the examples above. Test methods for evaluation of the different performance dimensions may take place in heated ovens, facsimiles of printing systems or in actual printing systems such as commercially available from Xerox Corporation. The ink formulation can be resistant to substantial aggregation and settling of the carbon black colorant in the melt and up to about the jetting temperature of the ink as well when exposed to freeze law cycles.

TABLE 1

| Performance Stability Attribute | Ink of Example 3 | Ink of Example 7 | Ink of Example 8 | Ink of Example 9 |
|---|---|---|---|---|
| Particle Size Growth Stability (128° C., 1000?) | None | Slight | Slight | Substantial |
| Print Head Stability | Good | Good | Good | Good |
| Thermal Stability | Stable | Less Stable than Ink of Example 3 | Less Stable than Ink of Example 3 | Less Stable than Ink of Example 3 |
| Oxidative Stability in Oxygen Permeable Tubing at 115° C. | > 20 days | 10 days | 4 days | 10 days |
| Print head Faceplate Wetting | Slight wetting | No wetting | No Wetting | Excessive wetting |

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. An ink formulation comprising (a) an ink base, (b) a poly(hydroxystearic acid) derived dispersant and (c) a carbon black pigment, wherein said dispersant is of a general formula III:

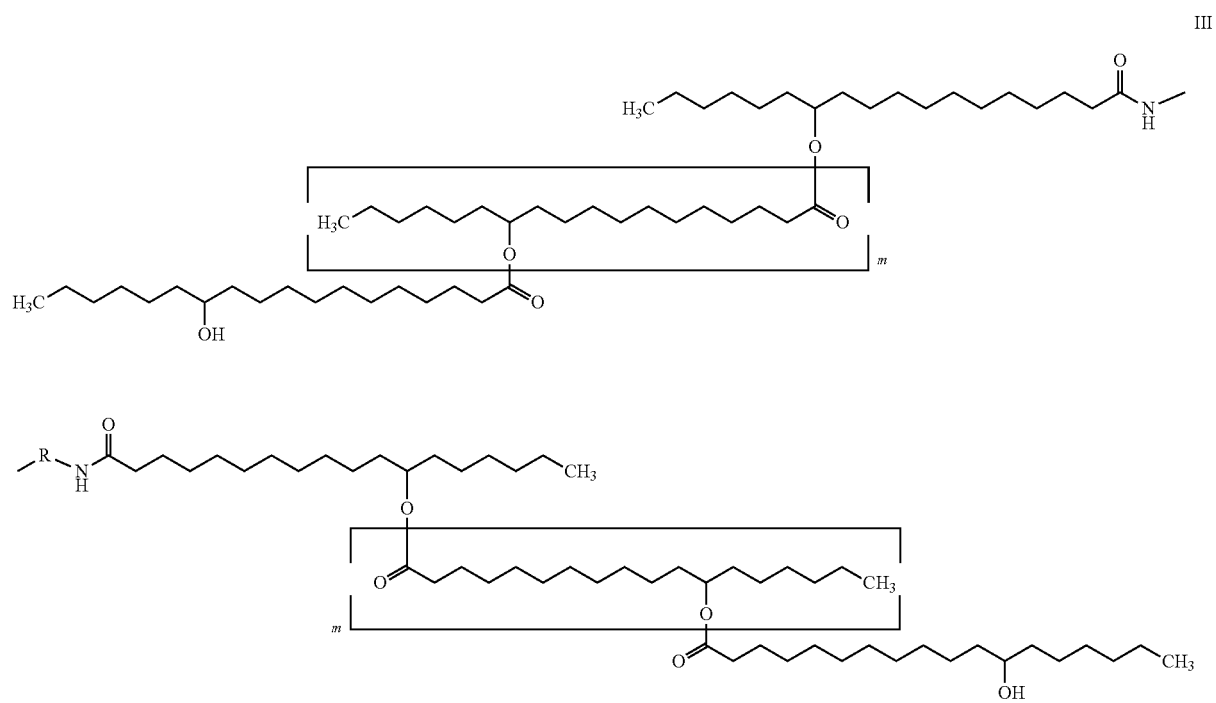

in which
R is
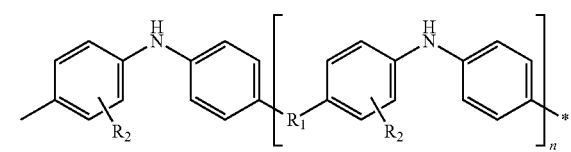
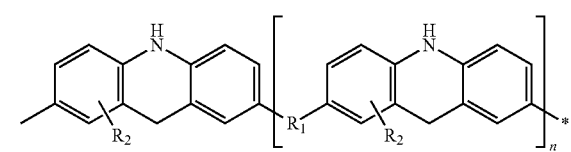
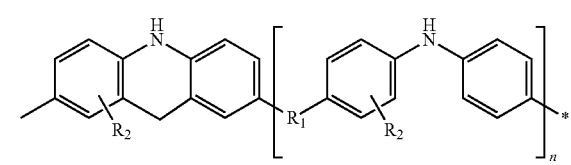
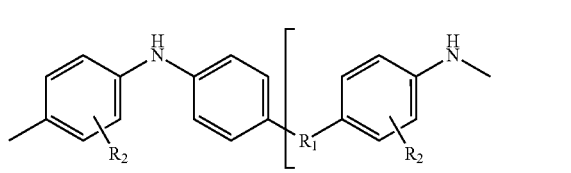
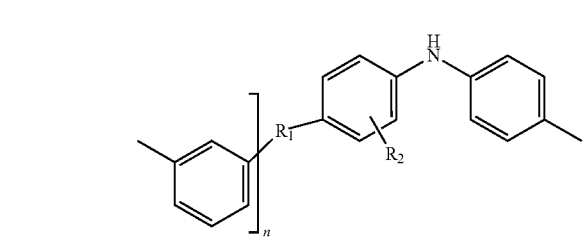
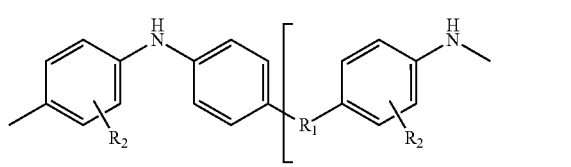
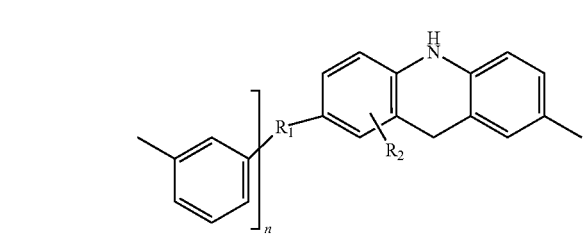
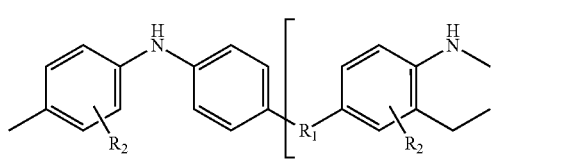
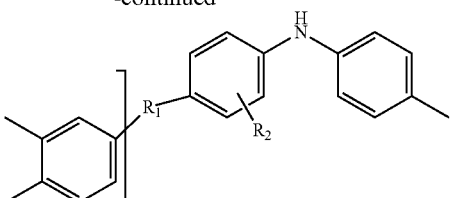
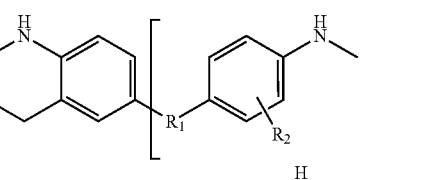
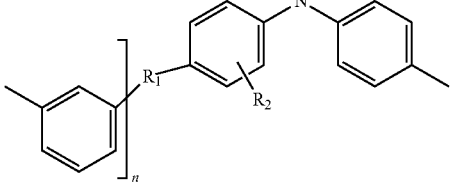
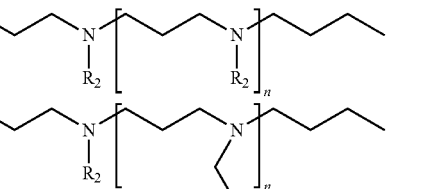
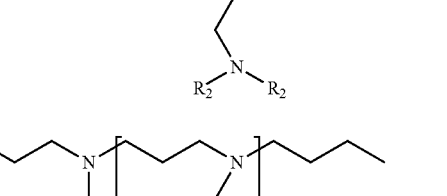
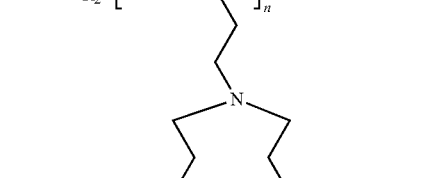
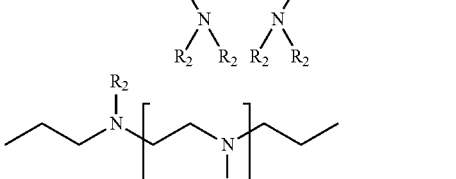
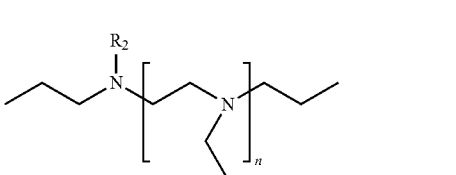
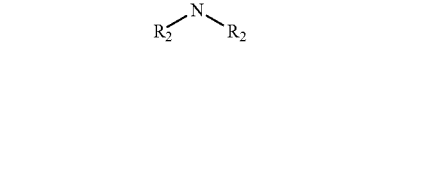

27
-continued

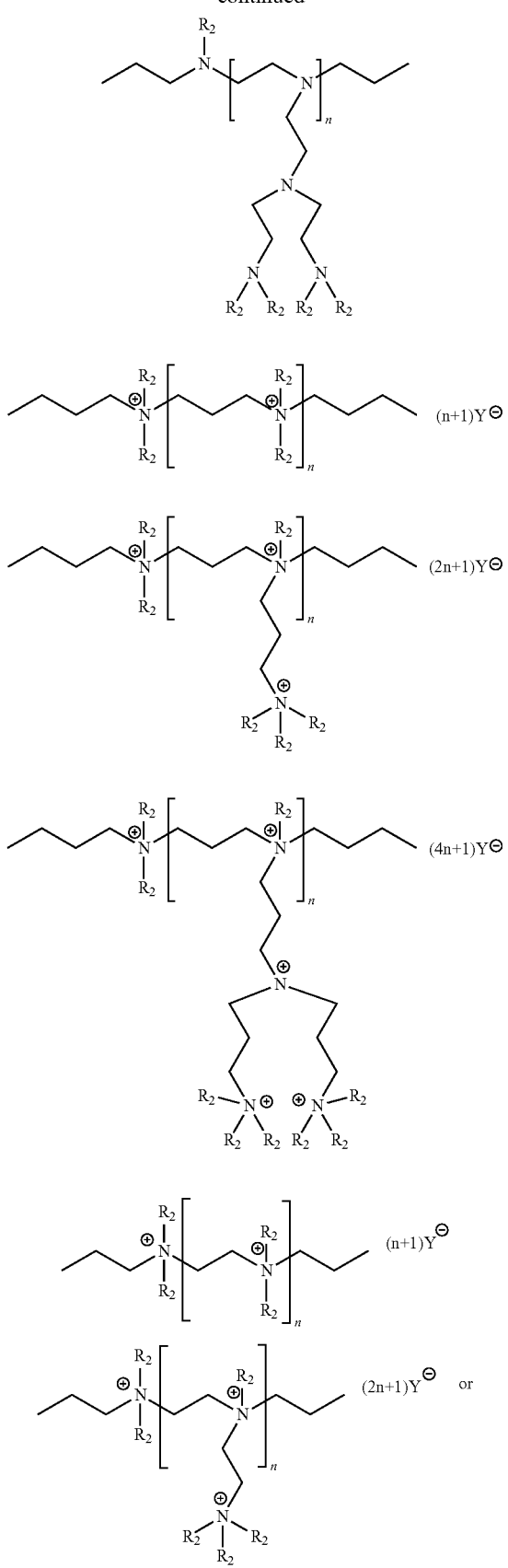

28
-continued

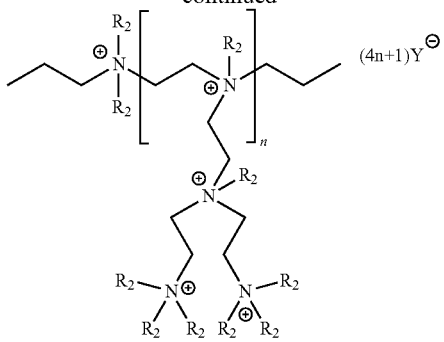

Y is $R_2SO_3$—, $CF_3SO_3$—, Cl–, Br—, I—, or $R_2CO_3$—, $R_1$ is —$CH_2$, or —$CH(R_2)$;

$R_2$ is independently H, —$CH_3$, —$C_2H_5$, —$C_3H_7$, —$C_4H_9$, —$C_5H_{11}$, —$C_6H_{13}$, —$C_7H_{15}$, —$C_8H_{17}$, —$C_9H_{19}$, —$C_{11}H_{21}$, —$C_{12}H_{23}$, —$C_{13}H_{25}$, —$C_{14}H_{27}$, —$C_{15}H_{29}$, —$C_{16}H_{31}$, —$C_{17}H_{33}$ or —$C_{18}H_{37}$;

n is an integer between 1 and 5; and m is an integer between 1 and 5.

2. The ink according to claim 1, wherein the ink base is present in an amount of at least 50% by weight of the ink formulation and has a melting point of less than about 120° C.

3. The ink according to claim 1, wherein the carbon black pigment is in a range of from about 0.1 to about 10% by weight of the ink formulation and the dispersant is in a range of from about 0.03 to about 40% by weight of the ink formulation.

4. The ink according to claim 1, wherein the wherein the carbon black pigment is in a range of from about 0.2 to about 5% by weight of the ink formulation and the dispersant is in a range of from about 0.06 to about 20% by weight of the ink formulation.

5. The ink according to claim 1, further comprising a synergist.

6. The ink according to claim 5, wherein the carbon black pigment is in a range of from about 0.1 to about 10% by weight of the ink formulation, the dispersant is in a range of from about 0.03 to about 40% by weight of the ink formulation, and the synergist is in a range from about 0.01 to about 3% by weight of the ink formulation.

7. The ink according to claim 5, wherein the carbon black pigment is in a range of from about 0.5 to about 3% by weight of the ink formulation, the dispersant is in a range of from about 0.15 to about 12% by weight of the ink formulation and the synergist is in a range from about 0.05 to about 0.9% by weight of the ink formulation.

8. A stable ink formulation comprising (a) an ink base, (c) a poly(hydroxystearic acid) derived dispersant, (c) a synergist, and (d) a carbon black pigment, wherein said dispersant is of a general formula III:

III
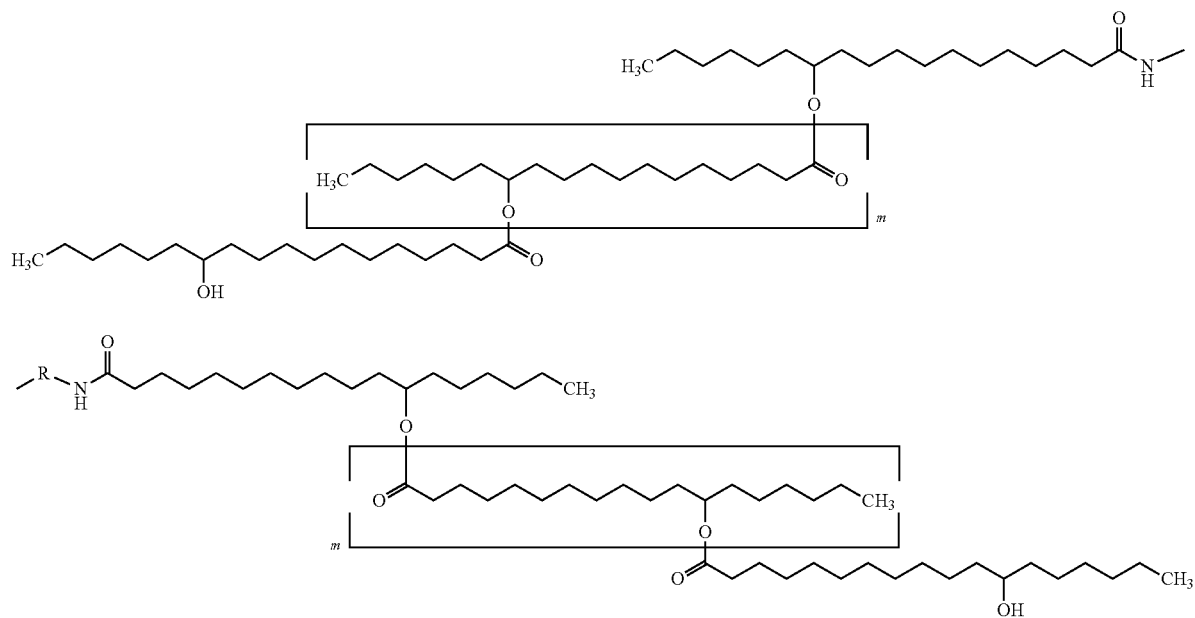
in which
R is
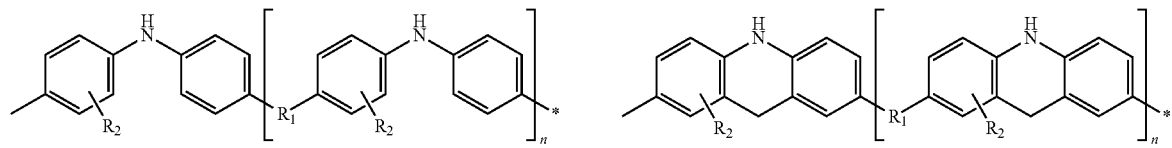
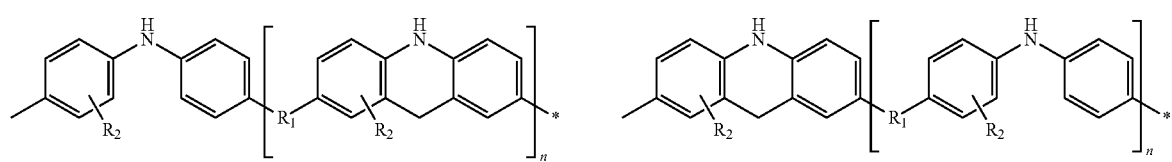
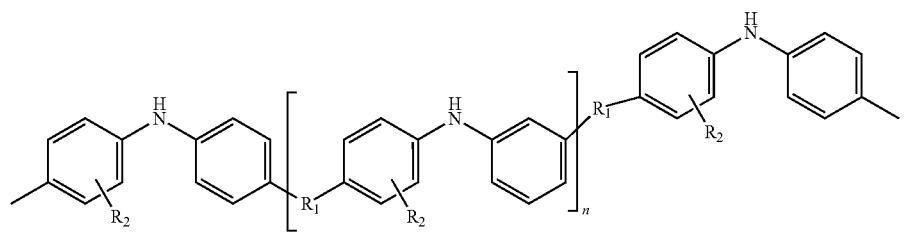
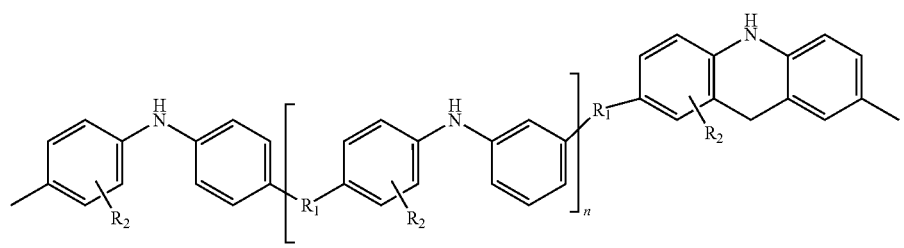

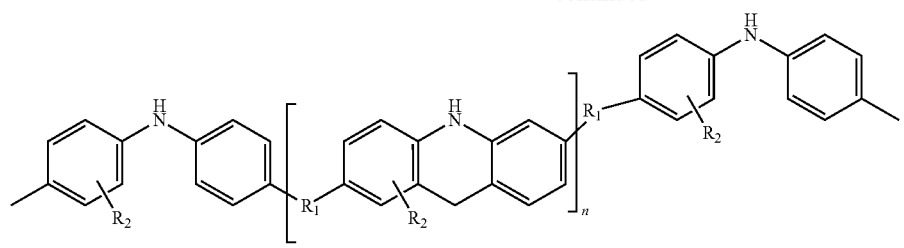
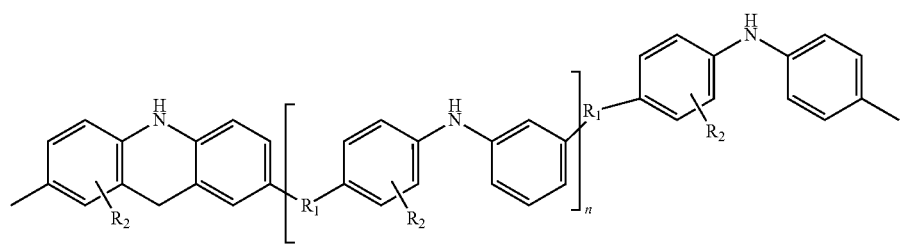
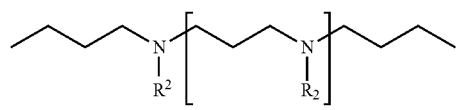
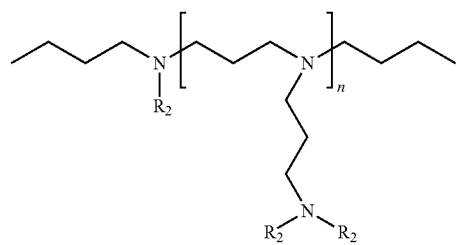
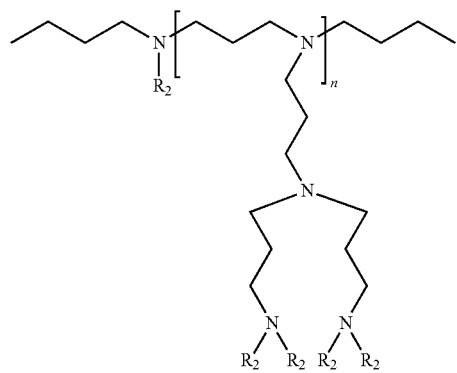
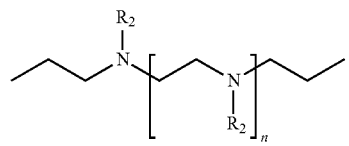
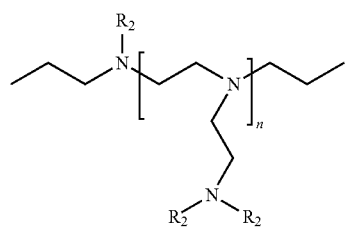
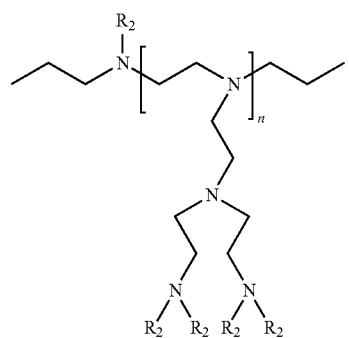

33

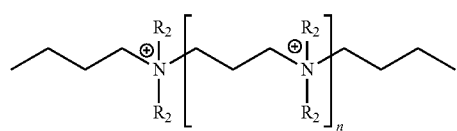

34

-continued

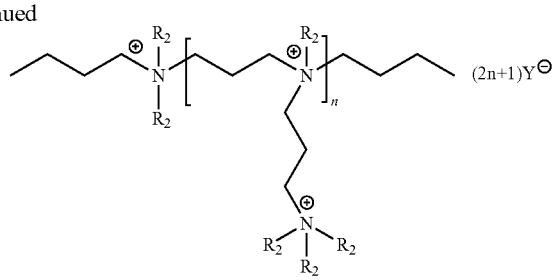

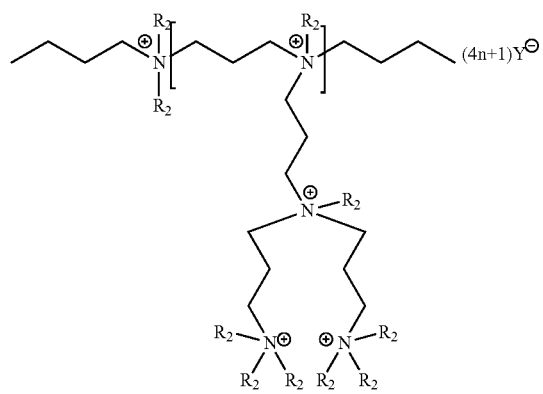

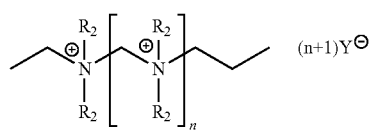

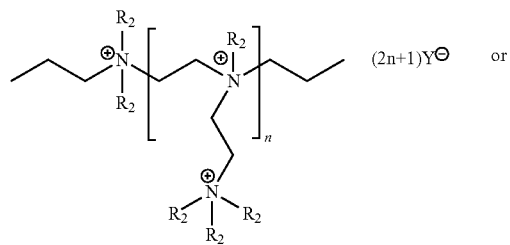

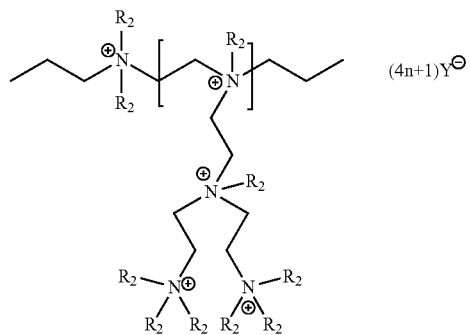

Y is $R_2SO_3—$, $CF_3SO_3—$, Cl—, Br—, I—, or $R_2CO_3—$,
$R_1$ is —$CH_2$,
$R_2$ is H
n is an integer between 1 and 5; and m is an integer between 1 and 5 and said ink formulation has a constant particle size distribution over time and an oxidative stability in oxygen permeable tubing at 115° C. over more than 20 days.

9. The ink according to claim 8, wherein the ink base is present in an amount of at least 50% by weight of the ink formulation and has a melting point of less than about 120° C.

10. The ink according to claim 8, wherein the carbon black pigment is in a range of from about 0.1 to about 10% by weight of the ink formulation, the dispersant is in a range of from about 0.03 to about 40% by weight of the ink formulation and the synergist is in a range from about 0.01 to about 3% by weight of the ink formulation.

11. The ink according to claim 8, wherein the carbon black pigment is in a range of from about 0.5 to about 3% by weight of the ink formulation, the dispersant is in a range of from about 0.15 to about 12% by weight of the ink formulation and the synergist is in a range from about 0.05 to about 0.9% by weight of the ink formulation.

12. A method for producing an ink formulation comprises:
  forming an ink base,
  forming a pigment concentrate by combining a poly(hydroxystearic acid) derived dispersant and a carbon black pigment,
  combining the ink base and the pigment concentrate to form an ink formulation, wherein said poly(hydroxysteric acid is of a general formula III:

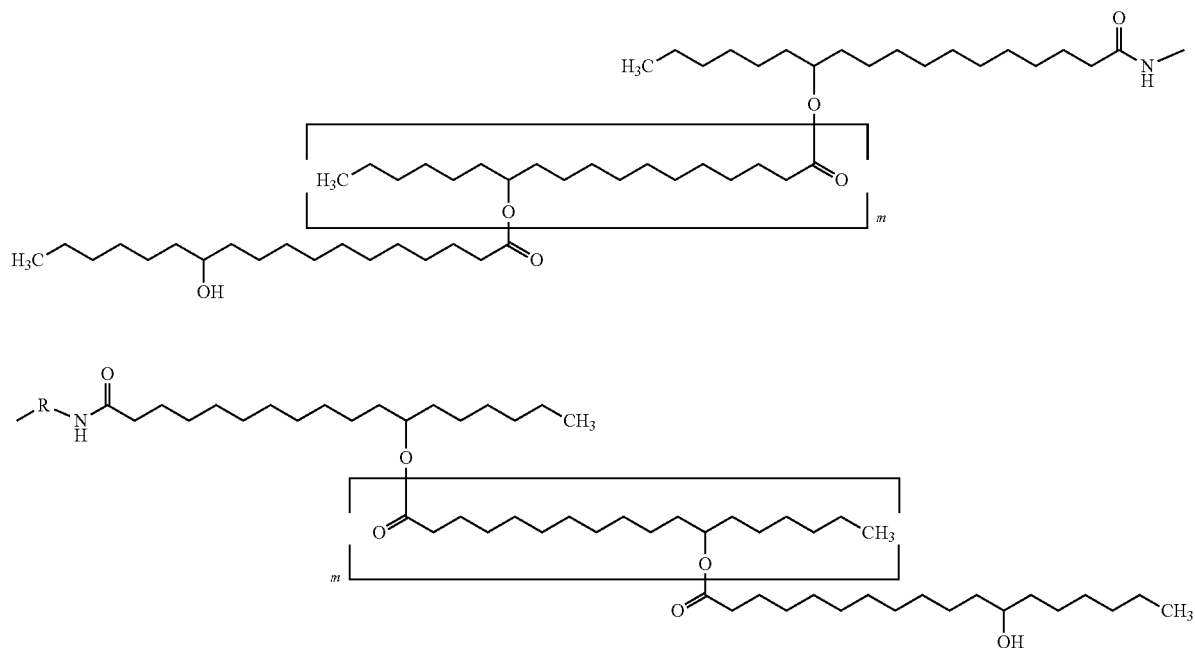
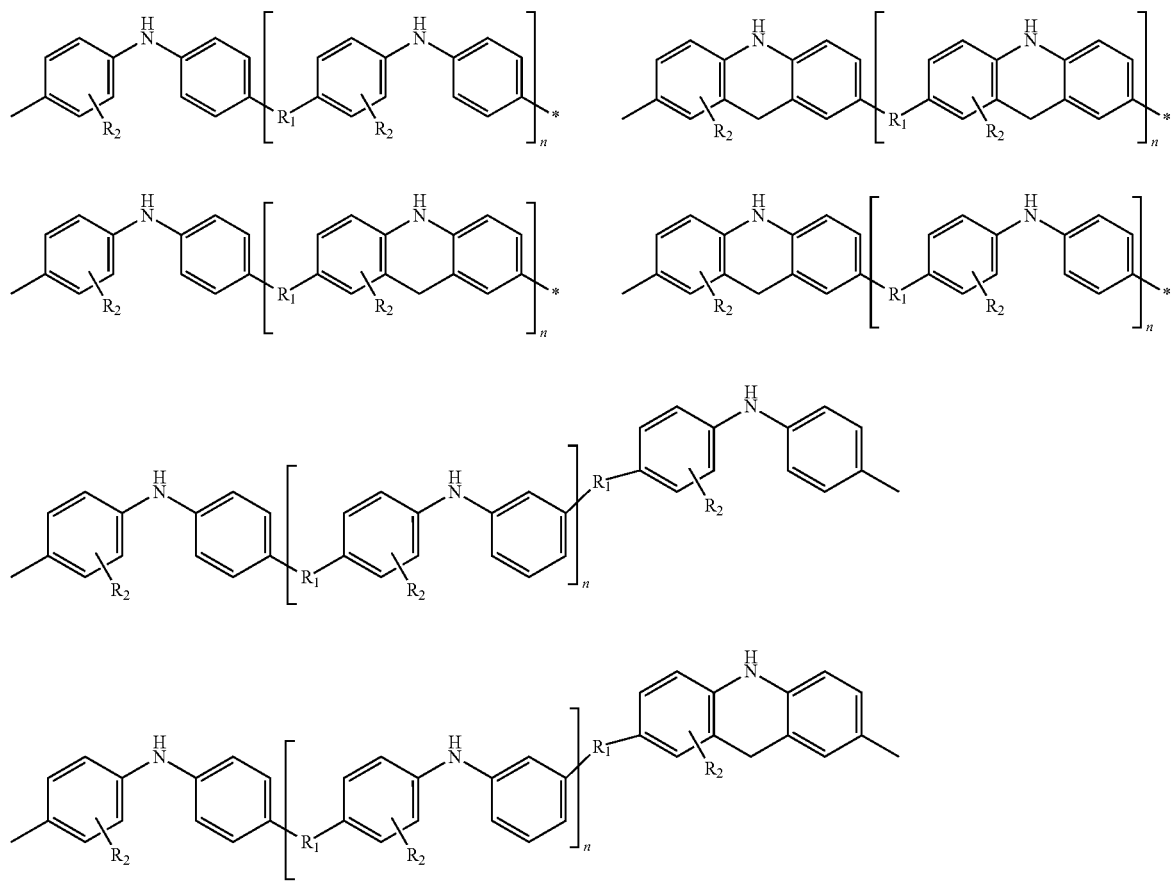
in which
R is

-continued
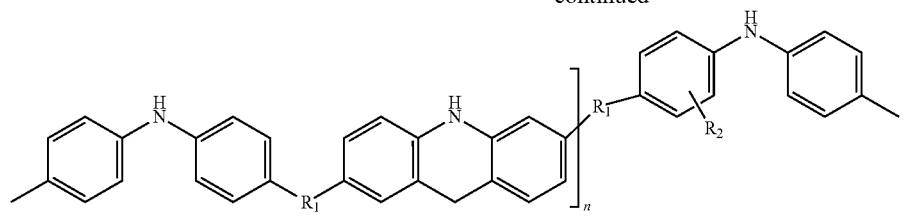
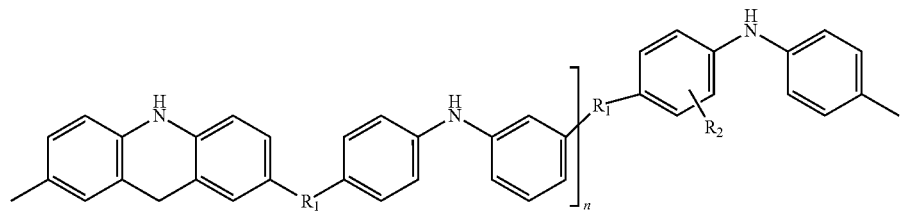
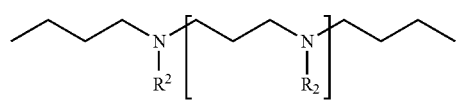
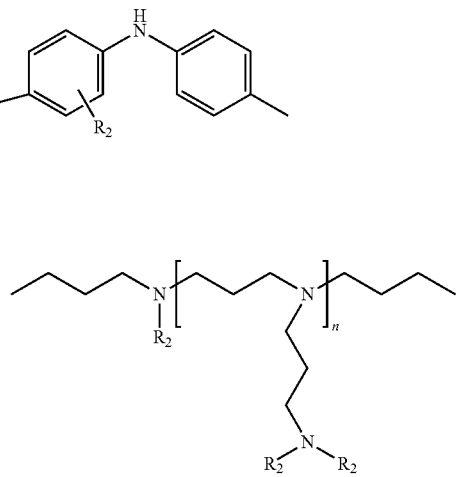
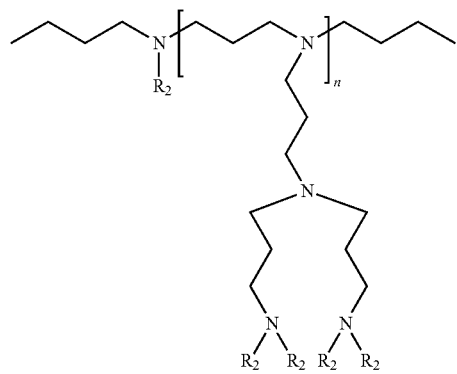
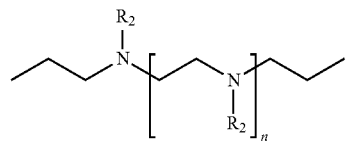
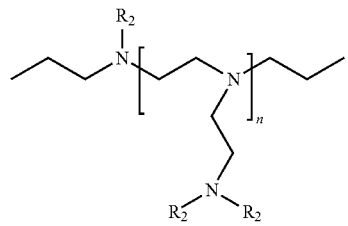
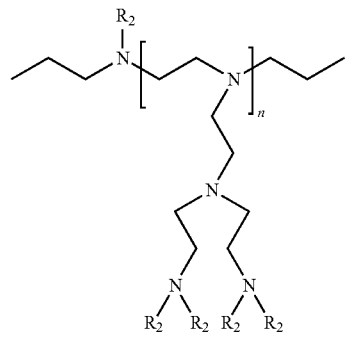
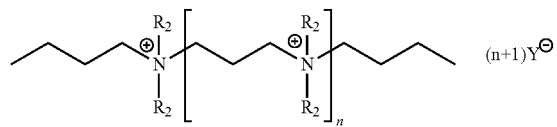
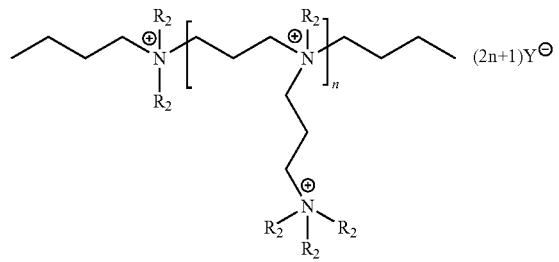

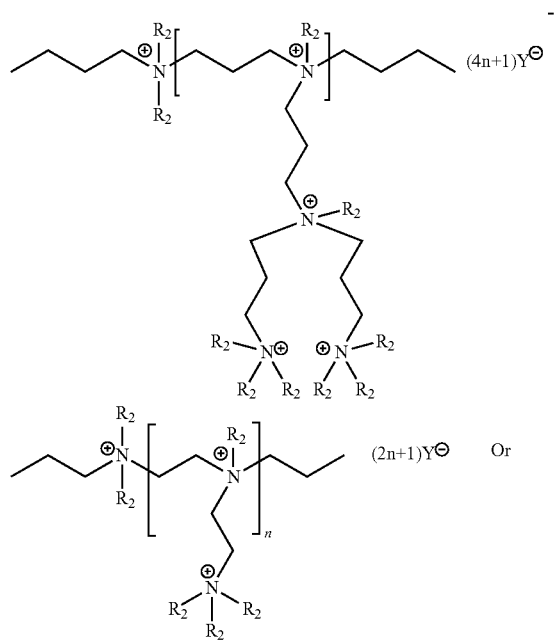
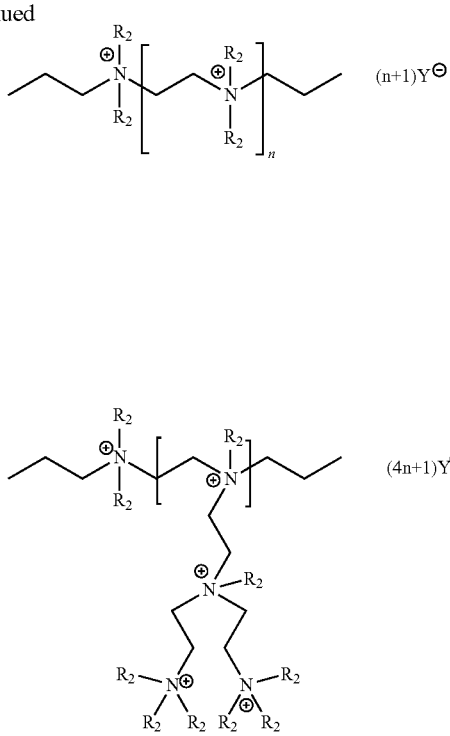
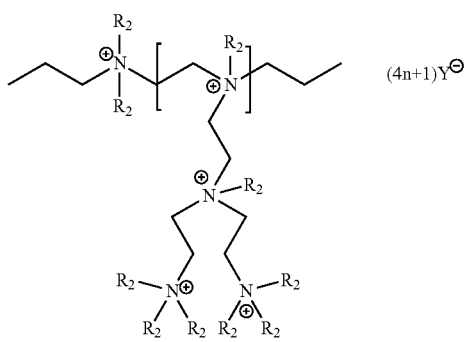

Y is $R_2SO_3-$, $CF_3SO_3-$, $Cl-$, $Br-$, $I-$, or $R_2CO_3-$,
$R_1$ is $-CH_2$, or $-CH(R_2)$;
$R_2$ is independently H, $-CH_3$, $-C_2H_5$, $-C_3H_7$, $-C_4H_9$, $-C_5H_{11}$, $-C_6H_{13}$, $-C_7H_{15}$, $-C_8H_{17}$, $-C_9H_{19}$, $-C_{11}H_{21}$, $-C_{12}H_{23}$, $-C_{13}H_{25}$, $-C_{14}H_{27}$, $-C_{15}H_{29}$, $-C_{16}H_{31}$, $-C_{17}H_{33}$ or $-C_{18}H_{37}$;
n is an integer between 1 and 5; and m is an integer between 1 and 5; and
filtering said ink formulation under pressure to provide a filtered phase change ink formulation.

13. The method of claim 12, wherein the ink base is present in an amount of at least 50% by weight of the ink formulation.

14. The method of claim 12, further comprising combining a synergist with the pigment concentrate.

15. The method according to claim 12, wherein the carbon black pigment is in a range of from about 0.1 to about 10% by weight of the ink formulation, the dispersant is in a range of from about 0.03 to about 40% by weight of the ink formulation and the synergist is in a range from about 0.01 to about 3% by weight of the ink formulation.

16. The method of claim 12, wherein the ink formulation is resistant to substantial aggregation and settling of the carbon black pigment in the melt and up to about the jetting temperature of the ink as well when exposed to freeze law cycles.

17. The method according to claim 12, wherein the ink has a melt viscosity of not more than about 30 centipoise at the jetting temperature.

* * * * *